US012756541B2

(12) United States Patent
Shao et al.

(10) Patent No.: US 12,756,541 B2
(45) Date of Patent: Oct. 6, 2026

(54) METHOD, APPARATUS, AND SYSTEM FOR TRAINING TREE MODEL

(71) Applicant: Huawei Technologies Co., Ltd., Shenzhen (CN)

(72) Inventors: Yunfeng Shao, Beijing (CN); Bingshuai Li, Beijing (CN); Haibo Tian, Guangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 371 days.

(21) Appl. No.: 18/344,185

(22) Filed: Jun. 29, 2023

(65) Prior Publication Data

US 2023/0353347 A1 Nov. 2, 2023

Related U.S. Application Data

(63) Continuation of application No. PCT/CN2021/143708, filed on Dec. 31, 2021.

(30) Foreign Application Priority Data

Dec. 31, 2020 (CN) ........................ 202011635228.X

(51) Int. Cl.
*H04L 9/08* (2006.01)
*H04L 9/00* (2022.01)
*H04L 9/40* (2022.01)

(52) U.S. Cl.
CPC ............ *H04L 9/0836* (2013.01); *H04L 9/008* (2013.01); *H04L 63/0428* (2013.01)

(58) Field of Classification Search
CPC ....... H04L 9/0836; H04L 9/008; G06F 18/21; G06F 18/24323; G06F 21/602; G06N 20/20; G06N 5/01; G06N 20/00
See application file for complete search history.

(56) References Cited

U.S. PATENT DOCUMENTS 9,521,082 B2 * 12/2016 Zhang ..................... H04L 45/48
11,588,621 B2 * 2/2023 Angel ....................... H04L 9/08
(Continued)

FOREIGN PATENT DOCUMENTS

CN 106611188 A 5/2017
CN 109002861 A 12/2018
CN 111144576 A 5/2020
CN 112052875 A 12/2020
CN 112052954 A 12/2020

OTHER PUBLICATIONS

Zhang et al.; "A Privacy-Preserving and Verifiable Federated Learning Scheme", 2020, IEEE, pp. 1-6. (Year: 2020).*
(Continued)

*Primary Examiner* — Hadi S Armouche
(74) *Attorney, Agent, or Firm* — Slater Matsil, LLP

(57) ABSTRACT

A first apparatus provides a second apparatus with encrypted label distribution information for the first node, so that the second apparatus calculates an intermediate parameter of a segmentation policy of the second apparatus side based on the encrypted label distribution information, and therefore a gain of the segmentation policy of the second apparatus side can be obtained. A preferred segmentation policy of the first node can also be obtained based on the gain of the segmentation policy of the second apparatus side and a gain of a segmentation policy of the first apparatus side. The encrypted label distribution information includes label data and distribution information, and is in a ciphertext state. The encrypted label distribution information can be used to determine the gain of the segmentation policy without leaking a distribution status of a sample set on the first node.

20 Claims, 15 Drawing Sheets

(56) References Cited

U.S. PATENT DOCUMENTS

| | | | | |
|---|---|---|---|---|
| 12,537,680 | B2 * | 1/2026 | Lee | H04L 9/0822 |
| 2017/0250915 | A1 * | 8/2017 | Long, III | H04L 41/0894 |
| 2019/0043076 | A1 * | 2/2019 | Dong | G06Q 30/02 |
| 2019/0377984 | A1 * | 12/2019 | Ghanta | G06F 18/2155 |
| 2020/0293952 | A1 * | 9/2020 | Siddiqui | G06F 18/24323 |
| 2020/0358599 | A1 * | 11/2020 | Baracaldo Angel | G06F 21/6227 |
| 2021/0051161 | A1 * | 2/2021 | Kirner | H04L 63/1416 |
| 2021/0174257 | A1 * | 6/2021 | Pothula | G06F 16/289 |
| 2022/0004933 | A1 * | 1/2022 | Gu | G06F 16/9027 |
| 2022/0036250 | A1 * | 2/2022 | Wang | G06N 5/04 |
| 2022/0180168 | A1 * | 6/2022 | Biggs | G16H 20/00 |
| 2022/0351090 | A1 * | 11/2022 | Tian | G06N 20/20 |
| 2023/0036702 | A1 * | 2/2023 | Reisser | G06N 3/02 |
| 2023/0046255 | A1 * | 2/2023 | Ferland | G06N 20/00 |
| 2026/0134643 | A1 * | 5/2026 | Shi | G06T 19/20 |

OTHER PUBLICATIONS

Wu et al.; "Privacy Preserving Vertical Federated Learning for Tree-based Models", 2020, Proceedings of the VLDB Endowment, vol. 13, No. 11, pp. 2090-2103. (Year: 2020).*

Liu et al.; "Federated Extra-Trees with Privacy Preserving", Feb. 2020, arXiv:2002.07323v1, pp. 1-7. (Year: 2020).*

Truex et al.; "A Hybrid Approach to Privacy-Preserving Federated Learning", Nov. 2019, AISec, pp. 1-11. (Year: 2019).*

Yang et al.; "Federated Machine Learning: Concept and Applications", Jan. 2019, ACM Transactions on Intelligent Systems and Technology, vol. 10, No. 2, Article 12, pp. 1-19 (Year: 2019).*

Yuncheng Wu, "Privacy Preserving Vertical Federated Learning for Tree-based Models," Proceedings of the VLOB Endowment, vol. 13, No. 12, Aug. 1, 2020 (Aug. 1, 2020), XP093159507, 18 pages.

Xiaoqiang who Cant Die, "Decision tree—Decision tree," downloaded from https://easyai.tech/ai-definition/decision-tree/, Jan. 3, 2019, 8 pages.

* cited by examiner

METHOD, APPARATUS, AND SYSTEM FOR TRAINING TREE MODEL

CROSS-REFERENCE TO RELATED APPLICATIONS

This disclosure is a continuation of International Application No. PCT/CN2021/143708, filed on Dec. 31, 2021, which claims priority to Chinese Patent Application No. 202011635228.X, filed on Dec. 31, 2020. The disclosures of the aforementioned applications are hereby incorporated by reference in their entireties.

TECHNICAL FIELD

This disclosure relates to the field of machine learning technologies, and in particular, to a method, an apparatus, and a system for training a tree model.

BACKGROUND

Federated learning is a distributed machine learning technology. With development of the federated learning technology, data in different entities may be used to jointly train a machine learning model, to enhance a learning capability of the model, and the data in the different entities does not leave the entities, to avoid leakage of raw data. For vertical federated learning, different features of a same sample belong to different entities. In other words, the different entities have a same sample space and different feature spaces. The different entities participate in vertical federated learning. An entity with label data of samples is referred to as a labeled party, and an entity without label data of samples is referred to as an unlabeled party.

Currently, for vertical federated learning of a tree model, in a process of constructing the tree model, if the unlabeled party obtains a distribution status of samples in the tree model on each node, a security risk of label data leakage exists. How to improve security of vertical federated learning becomes a problem that needs to be resolved.

SUMMARY

This disclosure provides a method, an apparatus, and a system for training a tree model, to improve security of vertical federated learning.

According to a first aspect, an embodiment of this disclosure provides a method for training a tree model. The method is applied to a first apparatus. The first apparatus is specifically an apparatus B in this disclosure, namely, a labeled party. In the method, the first apparatus determines, for a first node in the tree model, a gain corresponding to a segmentation policy (also referred to as a segmentation policy B) of the first apparatus. The first apparatus further receives an encrypted intermediate parameter corresponding to a first segmentation policy (specifically, a segmentation policy A or a first segmentation policy A) of a second apparatus for the first node and sent by the second apparatus. The second apparatus is specifically an apparatus A in this disclosure. The encrypted intermediate parameter corresponding to the first segmentation policy is determined based on encrypted label distribution information for the first node and a segmentation result of the first segmentation policy for each sample in the sample set. The sample set (namely, a sample set corresponding to a root node of the tree model) includes samples for training the tree model. The first apparatus further determines a preferred segmentation policy of the first node based on the gain corresponding to the segmentation policy of the first apparatus and a gain corresponding to the second segmentation policy (also referred to as a segmentation policy A or a second segmentation policy A) of the second apparatus for the first node. The first segmentation policy includes the second segmentation policy. The gain corresponding to the second segmentation policy is determined based on an encrypted intermediate parameter corresponding to the second segmentation policy. The intermediate parameter specifically refers to an intermediate parameter for calculating a gain.

In the foregoing method, the encrypted intermediate parameter corresponding to the first segmentation policy is determined based on the encrypted label distribution information for the first node. Therefore, the first apparatus does not need to send, to the second apparatus, a distribution status of a sample set for the first node in plaintext. In this case, the second apparatus does not obtain a distribution status of a sample set on each node in the tree model. Therefore, a risk that the distribution status of the sample set is used to speculate label data is reduced, and security of vertical federated learning is improved.

In a possible design, the encrypted label distribution information is determined based on first label information of the sample set and first distribution information of the sample set for the first node. The first label information includes label data of each sample in the sample set. The first distribution information includes indication data indicating whether each sample in the sample set belongs to the first node. In this solution, the encrypted label distribution information includes the label data and the distribution information. Therefore, the encrypted intermediate parameter corresponding to the first segmentation policy can be calculated based on the encrypted label distribution information, and then a gain corresponding to the first segmentation policy is calculated. In addition, the encrypted label distribution information is in a ciphertext state. This improves security.

In a possible design, indication data indicating that the sample belongs to the first node is a non-zero value, and indication data indicating that the sample does not belong to the first node is a value 0. Therefore, label data of a sample that does not belong to the first node corresponds to a value 0. In other words, the gain corresponding to the first segmentation policy for the first node may not be practically calculated.

In a possible design, the method further provides two methods for obtaining the encrypted label distribution information: (1) The first apparatus determines the label distribution information based on the first label information and the first distribution information, and encrypts the label distribution information to obtain the encrypted label distribution information; or (2) the first apparatus determines the encrypted label distribution information based on encrypted first label information and encrypted first distribution information. Then, the method further includes: The first apparatus sends the encrypted label distribution information to the second apparatus. Therefore, the second apparatus obtains the encrypted label distribution information, but does not obtain the distribution status of the sample set for the first node in plaintext.

In a possible design, that the encrypted label distribution information is determined based on the first label information and the first distribution information includes: The encrypted label distribution information is determined based on the encrypted first label information and the encrypted first distribution information. The method further includes: The first apparatus sends the encrypted first label information and the encrypted first distribution information to the second apparatus. Therefore, the second apparatus obtains the encrypted first label information and the encrypted first distribution information, but does not obtain the distribution status of the sample set for the first node in plaintext. This improves security. In addition, the second apparatus can perform calculation by itself to obtain the encrypted label distribution information, so that the gain corresponding to the first segmentation policy can be obtained based on the encrypted label distribution information.

In a possible design, the method further includes: The first apparatus obtains an encryption key for homomorphic encryption, where the encrypted label distribution information is determined based on the encryption key. The encrypted label distribution information, the encrypted first label information, and/or the encrypted first distribution information are/is obtained through encryption based on the encryption key. The first apparatus further decrypts, based on a decryption key, the encrypted intermediate parameter corresponding to the first segmentation policy to obtain an intermediate parameter corresponding to the first segmentation policy. The intermediate parameter corresponding to the first segmentation policy includes an intermediate parameter corresponding to the second segmentation policy. The gain corresponding to the second segmentation policy is determined based on the intermediate parameter corresponding to the second segmentation policy. Homomorphic encryption allows a specific form of operation to be performed on ciphertext to obtain a still encrypted result. A decryption key in a homomorphic key pair is used to decrypt an operation result of homomorphic encrypted data. The operation result is the same as that of plaintext. Therefore, the encrypted intermediate parameter obtained by the second apparatus through calculation based on the encrypted label distribution information in homomorphic encryption is the same as the intermediate parameter in the plaintext state after being decrypted by the first apparatus. In this way, security is ensured, and the intermediate parameter for calculating the gain is also obtained.

In a possible design, that the first apparatus obtains the encryption key for homomorphic encryption and the decryption key for homomorphic encryption specifically includes: The first apparatus generates a first encryption key for homomorphic encryption and a first decryption key for homomorphic encryption, receives a second encryption key for homomorphic encryption sent by the second apparatus, and determines a third encryption key based on the first encryption key and the second encryption key, where the encrypted label distribution information is determined based on the encryption key. The encrypted label distribution information, the encrypted first label information, and/or the encrypted first distribution information are/is obtained through encryption based on the encryption key. That the first apparatus decrypts, based on a decryption key, the encrypted intermediate parameter corresponding to the first segmentation policy to obtain an intermediate parameter corresponding to the first segmentation policy includes: The first apparatus decrypts the encrypted intermediate parameter corresponding to the first segmentation policy based on the first decryption key to obtain the intermediate parameter corresponding to the first segmentation policy. This solution corresponds to a public key synthesis technology.

In a possible design, that the first apparatus decrypts the encrypted intermediate parameter corresponding to the first segmentation policy based on the first decryption key to obtain the intermediate parameter corresponding to the first segmentation policy specifically includes: The first apparatus decrypts the encrypted intermediate parameter corresponding to the first segmentation policy based on the first decryption key to obtain an encrypted intermediate parameter corresponding to the first segmentation policy and decrypted by the first apparatus; receive that the second apparatus decrypts the encrypted intermediate parameter corresponding to the first segmentation policy based on the second decryption key to obtain an encrypted intermediate parameter corresponding to the first segmentation policy and decrypted by the second apparatus; and determine the intermediate parameter corresponding to the first segmentation policy based on the encrypted intermediate parameter corresponding to the first segmentation policy and decrypted by the first apparatus and the encrypted intermediate parameter corresponding to the first segmentation policy and decrypted by the second apparatus.

In a possible design, that the first apparatus decrypts the encrypted intermediate parameter corresponding to the first segmentation policy based on the first decryption key to obtain the intermediate parameter corresponding to the first segmentation policy specifically includes: The first apparatus receives that the second apparatus decrypts the encrypted intermediate parameter corresponding to the first segmentation policy based on the second decryption key to obtain the encrypted intermediate parameter corresponding to the first segmentation policy and decrypted by the second apparatus; and decrypts, based on the first decryption key, the encrypted intermediate parameter corresponding to the first segmentation policy and decrypted by the second apparatus, to obtain the intermediate parameter corresponding to the first segmentation policy.

In a possible design, if the preferred segmentation policy is one of the segmentation policies of the first apparatus, the first apparatus further determines a segmentation result of the preferred segmentation policy for each sample in the sample set, or a segmentation result of the preferred segmentation policy for each sample in a first sample subset, where each sample in the first sample subset belongs to the first node. Further, the first apparatus further determines second distribution information of the sample set for a first child node of the first node based on the segmentation result of the preferred segmentation policy and the first distribution information, or determines encrypted second distribution information of the sample set for the first child node based on the segmentation result of the preferred segmentation policy and the encrypted first distribution information. The first child node is one of at least one child node of the first node. The second distribution information or the encrypted second distribution information or both are used to determine encrypted label distribution information of the first child node. Then, the first apparatus and the second apparatus may continue to train the first child node based on the encrypted label distribution information of the first child node, for example, determine a preferred policy of the first child node. During specific implementation, the segmentation result of the preferred segmentation policy may be plaintext or ciphertext.

In a possible design, if the preferred segmentation policy is one of the second segmentation policies (or one of the first segmentation policies), the first apparatus further sends the encrypted first distribution information and indication information about the preferred segmentation policy to the second apparatus, and receives encrypted second distribution information that is of the sample set for the first child node of the first node and that is sent by the second apparatus, where the encrypted second distribution information is determined based on the encrypted first distribution information and the segmentation result of the preferred segmentation policy for the sample set. Similar to the foregoing possible design, the encrypted second distribution information is used to determine the encrypted label distribution information of the first child node, to facilitate training on the first child node. During specific implementation, the segmentation result of the preferred segmentation policy may be plaintext or ciphertext. For example, that the encrypted second distribution information is determined based on the encrypted first distribution information and the segmentation result of the preferred segmentation policy for the sample set includes: The encrypted second distribution information is determined based on the encrypted first distribution information and an encrypted segmentation result of the preferred segmentation policy for the sample set.

Further, the first apparatus may further decrypt the encrypted second distribution information to obtain second distribution information for the first child node, where the second distribution information includes indication data indicating whether each sample in the sample set belongs to the first child node. The first apparatus determines a second sample subset based on the second distribution information, where each sample in the second sample set belongs to the first child node. The second sample subset helps the first apparatus train the first child node. For example, a segmentation result of the segmentation policy of the first apparatus for the second sample subset is more efficiently determined.

In a possible design, the first apparatus further receives the gain corresponding to the second segmentation policy and sent by the second apparatus, where the gain corresponding to the second segmentation policy is an optimal gain in the gain corresponding to the first segmentation policy (in other words, the second segmentation policy has the optimal gain in the first segmentation policy), and the gain corresponding to the first segmentation policy is determined based on the encrypted intermediate parameter corresponding to the first segmentation policy. In this case, the first apparatus receives the gain of the second segmentation policy with the optimal gain of the second apparatus, and may determine the preferred segmentation policy based on the gain of the second segmentation policy and the gain of the segmentation policy of the first apparatus, without obtaining more plaintext information of the second apparatus. This further improves security.

In a possible design, the encrypted intermediate parameter corresponding to the first segmentation policy is an encrypted second intermediate parameter corresponding to the first segmentation policy. The encrypted second intermediate parameter includes noise from the second apparatus. In the method, the first apparatus further decrypts the encrypted second intermediate parameter to obtain a second intermediate parameter corresponding to the first segmentation policy, and sends the second intermediate parameter corresponding to the first segmentation policy to the second apparatus, where the gain corresponding to the first segmentation policy is determined based on the second intermediate parameter corresponding to the first segmentation policy and obtained through noise removal. In this solution, the encrypted second intermediate parameter sent by the second apparatus to the first apparatus includes the noise from the second apparatus. Therefore, after decrypting the encrypted second intermediate parameter, the first apparatus cannot obtain a correct intermediate parameter corresponding to the first segmentation policy. This reduces a risk of data leakage on the second apparatus side and further improves security.

In a possible design, the first apparatus sends the encryption key used for homomorphic encryption to the second apparatus. Second noise is obtained by encrypting first noise based on the encryption key. Noise included in the encrypted second intermediate parameter is the second noise. That the first apparatus decrypts the encrypted second intermediate parameter to obtain a second intermediate parameter corresponding to the first segmentation policy includes: The first apparatus decrypts the encrypted second intermediate parameter based on the decryption key for homomorphic encryption to obtain the second intermediate parameter corresponding to the first segmentation policy. That the gain corresponding to the first segmentation policy is determined based on the second intermediate parameter corresponding to the first segmentation policy and obtained through noise removal specifically includes: The gain corresponding to the first segmentation policy is determined based on a first intermediate parameter corresponding to the first segmentation policy, where the first intermediate parameter corresponding to the first segmentation policy is obtained by removing the first noise from the second intermediate parameter corresponding to the first segmentation policy.

In this solution, the first apparatus provides the second apparatus with the encryption key for homomorphic encryption, so that the second apparatus may encrypt the first noise based on the encryption key to obtain the second noise. The encrypted second intermediate parameter sent by the second apparatus to the first apparatus includes the second noise. The first apparatus cannot obtain information about the correct intermediate parameter on the second apparatus side after decrypting the encrypted second intermediate parameter. Because the calculation under the homomorphic encryption does not change a calculation result of plaintext, the second apparatus can remove the first noise in the decrypted second intermediate parameter. In this way, a more secure feasible solution for introducing noise is provided.

In a possible design, the first apparatus decrypts the encrypted intermediate parameter corresponding to the first segmentation policy to obtain the encrypted intermediate parameter corresponding to the first segmentation policy and decrypted by the first apparatus, and sends, to the second apparatus, the encrypted intermediate parameter corresponding to the first segmentation policy and decrypted by the first apparatus, where the gain corresponding to the first segmentation policy is determined based on the encrypted intermediate parameter corresponding to the first segmentation policy and decrypted by the first apparatus. This solution corresponds to the public key synthesis technology. Therefore, after decryption, the first apparatus cannot obtain the plaintext intermediate parameter corresponding to the first segmentation policy of the second apparatus. This further improves security.

In a possible design, that the first apparatus determines, for a first node, a gain corresponding to a segmentation policy of the first apparatus specifically includes: The first apparatus determines, for the first node, a segmentation result of the segmentation policy of the first apparatus for each sample in the sample set; determines an encrypted intermediate parameter corresponding to the segmentation policy of the first apparatus based on the segmentation result of the segmentation policy of the first apparatus for each sample and the encrypted label distribution information for the first node; obtains an intermediate parameter corresponding to the segmentation policy of the first apparatus based on the encrypted intermediate parameter corresponding to the segmentation policy of the first apparatus; and determines the gain corresponding to the segmentation policy of the first apparatus based on the intermediate parameter corresponding to the segmentation policy of the first apparatus. This solution corresponds to the public key synthesis technology. In this case, the first apparatus performs calculation in a ciphertext state to obtain the encrypted intermediate parameter corresponding to the segmentation policy of the first apparatus, that is, calculates the encrypted intermediate parameter based on the encrypted label distribution information for the first node. Therefore, the first apparatus does not obtain a distribution status of the sample set for the first node in plaintext. This further improves security.

In a possible design, that the first apparatus obtains an intermediate parameter corresponding to the segmentation policy of the first apparatus based on the encrypted intermediate parameter corresponding to the segmentation policy of the first apparatus specifically includes: The first apparatus obtains the intermediate parameter corresponding to the segmentation policy of the first apparatus based on the encrypted intermediate parameter corresponding to the segmentation policy of the first apparatus and sends the encrypted intermediate parameter corresponding to the segmentation policy of the first apparatus to the second apparatus; receives the encrypted intermediate parameter corresponding to the segmentation policy of the first apparatus and decrypted by the second apparatus and sent by the second apparatus; and determines the intermediate parameter corresponding to the segmentation policy of the first apparatus based on the encrypted intermediate parameter corresponding to the segmentation policy of the first apparatus and decrypted by the second apparatus.

In a possible design, the first segmentation policy is the second segmentation policy. The method further includes: The first apparatus decrypts the encrypted intermediate parameter corresponding to the first segmentation policy to obtain the intermediate parameter corresponding to the first segmentation policy; and determines the gain corresponding to the second segmentation policy based on the intermediate parameter corresponding to the first segmentation policy.

In a possible design, the first apparatus further sends indication information about the preferred segmentation policy to the second apparatus.

In a possible design, the first apparatus further updates the tree model based on the preferred segmentation policy.

According to a second aspect, an embodiment of this disclosure provides a method for training a tree model. The method is applied to a second apparatus. The second apparatus is specifically an apparatus A in this disclosure, namely, an unlabeled party. In the method, the second apparatus determines, for a first node of the tree model, a segmentation result of a first segmentation policy (specifically, a segmentation policy A or a first segmentation policy A) of the second apparatus for each sample in a sample set, where the sample set includes samples for training the tree model (namely, a sample set corresponding to a root node of the tree model); determines an encrypted intermediate parameter corresponding to the first segmentation policy based on the segmentation result of the first segmentation policy for each sample and encrypted label distribution information for the first node; and sends the encrypted intermediate parameter corresponding to the first segmentation policy to the first apparatus, where the encrypted intermediate parameter is used to determine a preferred segmentation policy of the first node.

In the foregoing method, the encrypted intermediate parameter corresponding to the first segmentation policy is determined based on the encrypted label distribution information for the first node, so that the second apparatus does not need to obtain a distribution status of the sample set for the first node in plaintext. Therefore, a risk that the distribution status of the sample set is used to speculate label data is reduced, and security of vertical federated learning is improved.

In a possible design, the encrypted label distribution information for the first node is determined based on first label information of the sample set and first distribution information of the sample set for the first node. The first label information includes label data of each sample in the sample set. The first distribution information includes indication data indicating whether each sample belongs to the first node. In this solution, the encrypted label distribution information includes the label data and the distribution information. Therefore, the encrypted intermediate parameter corresponding to the first segmentation policy can be calculated based on the encrypted label distribution information, and then a gain corresponding to the first segmentation policy is calculated. In addition, the encrypted label distribution information is in a ciphertext state. This improves security.

In a possible design, indication data indicating that the sample belongs to the first node is a non-zero value, and indication data indicating that the sample does not belong to the first node is a value 0. Therefore, label data of a sample that does not belong to the first node corresponds to a value 0. In other words, the gain corresponding to the first segmentation policy for the first node may not be practically calculated.

In a possible design, the method further provides two methods for obtaining the encrypted label distribution information: (1) The second apparatus receives the encrypted label distribution information sent by the first apparatus; or (2) the second apparatus receives encrypted first label information and encrypted first distribution information that are sent by the first apparatus; and determines the encrypted label distribution information based on the encrypted first label information and the encrypted first distribution information. Therefore, the second apparatus obtains the encrypted label distribution information, but does not obtain the distribution status of the sample set for the first node in plaintext.

In a possible design, the second apparatus further receives the encrypted first distribution information and indication information about the preferred segmentation policy that are sent by the first apparatus; determines the preferred segmentation policy based on the indication information, where the preferred segmentation policy is in the first segmentation policy of the second apparatus; determines encrypted second distribution information of the sample set for the first child node of the first node based on the encrypted first distribution information and a segmentation result of the preferred segmentation policy for the sample set; and sends the encrypted second distribution information to the first apparatus. The first child node is one of at least one child node of the first node. The encrypted second distribution information is used to determine encrypted label distribution information of the first child node. Then, the first apparatus and the second apparatus may continue to train the first child node based on the encrypted label distribution information of the first child node, for example, determine a preferred policy of the first child node. During specific implementation, the segmentation result of the preferred segmentation policy may be plaintext or ciphertext. For example, that the second apparatus determines encrypted second distribution information based on the encrypted first distribution information and a segmentation result of the preferred segmentation policy for the sample set includes: The second apparatus determines the encrypted second distribution information based on the encrypted first distribution information and an encrypted segmentation result of the preferred segmentation policy for the sample set.

In a possible design, the second apparatus further obtains an intermediate parameter corresponding to the first segmentation policy based on the encrypted intermediate parameter corresponding to the first segmentation policy; determines the gain corresponding to the first segmentation policy based on the intermediate parameter corresponding to the first segmentation policy; determines a second segmentation policy with an optimal gain based on the gain corresponding to the first segmentation policy; and sends the gain of the second segmentation policy to the first apparatus, where the gain of the second segmentation policy is used to determine the preferred segmentation policy of the first node. In this case, the second apparatus determines to send the second segmentation policy with the optimal gain in the first segmentation policy on the second apparatus side, and provides the gain of the second segmentation policy for the first apparatus to determine the preferred segmentation policy. The first apparatus only needs to obtain the gain of the second segmentation policy, and does not need to obtain more plaintext information of the second apparatus. This further improves security.

In a possible design, the encrypted intermediate parameter corresponding to the first segmentation policy is an encrypted second intermediate parameter corresponding to the first segmentation policy. That the second apparatus determines an encrypted intermediate parameter corresponding to the first segmentation policy based on the segmentation result of the first segmentation policy for each sample and encrypted label distribution information for the first node includes: The second apparatus determines an encrypted first intermediate parameter corresponding to the first segmentation policy based on the segmentation result of the first segmentation policy for each sample and the encrypted label distribution information for the first node; and introduces noise into the encrypted first intermediate parameter to obtain the encrypted second intermediate parameter corresponding to the first segmentation policy. The intermediate parameter corresponding to the first segmentation policy is a first intermediate parameter corresponding to the first segmentation policy. That the second apparatus obtains an intermediate parameter corresponding to the first segmentation policy based on the encrypted intermediate parameter corresponding to the first segmentation policy includes: receiving a second intermediate parameter corresponding to the first segmentation policy and sent by the first apparatus, where the second intermediate parameter is obtained by decrypting the encrypted second intermediate parameter; and removing noise from the second intermediate parameter corresponding to the first segmentation policy to obtain the first intermediate parameter corresponding to the first segmentation policy.

In this solution, the encrypted second intermediate parameter sent by the second apparatus to the first apparatus includes the noise from the second apparatus. Therefore, after decrypting the encrypted second intermediate parameter, the first apparatus cannot obtain a correct intermediate parameter corresponding to the first segmentation policy. This reduces a risk of data leakage on the second apparatus side and further improves security.

In a possible design, the second intermediate parameter is obtained by decrypting the encrypted second intermediate parameter based on a decryption key for homomorphic encryption. The method further includes: The second apparatus further receives an encryption key for homomorphic encryption sent by the first apparatus; determines first noise; and encrypts the first noise based on the encryption key to obtain second noise. That the second apparatus introduces noise into the encrypted first intermediate parameter to obtain the encrypted second intermediate parameter specifically includes: The second apparatus determines the encrypted second intermediate parameter corresponding to the first segmentation policy based on the second noise and the encrypted first intermediate parameter. The removing noise from the second intermediate parameter corresponding to the first segmentation policy includes: removing the first noise from the second intermediate parameter corresponding to the first segmentation policy.

In this solution, the second apparatus receives the encryption key for homomorphic encryption provided by the first apparatus, so that the second apparatus may encrypt the first noise based on the encryption key to obtain the second noise. The encrypted second intermediate parameter sent by the second apparatus to the first apparatus includes the second noise. The first apparatus cannot obtain information about the correct intermediate parameter on the second apparatus side after decrypting the encrypted second intermediate parameter. Because the calculation under the homomorphic encryption does not change a calculation result of plaintext, the second apparatus can remove the first noise in the decrypted second intermediate parameter. In this way, a more secure feasible solution for introducing noise is provided.

In a possible design, that the second apparatus determines the intermediate parameter corresponding to the first segmentation policy based on the encrypted intermediate parameter corresponding to the first segmentation policy specifically includes: The second apparatus receives the encrypted intermediate parameter corresponding to the first segmentation policy and decrypted by the first apparatus and sent by the first apparatus; and determines the intermediate parameter corresponding to the first segmentation policy based on the encrypted intermediate parameter corresponding to the first segmentation policy and decrypted by the first apparatus. This solution corresponds to a public key synthesis technology. Therefore, after decryption, the first apparatus cannot obtain the plaintext intermediate parameter corresponding to the first segmentation policy of the second apparatus. This further improves security.

In a possible design, the second apparatus further receives the indication information about the preferred segmentation policy and sent by the first apparatus, and then updates the tree model based on the indication information of the preferred segmentation policy.

In a possible design, the second apparatus further generates a second encryption key for homomorphic encryption and a second decryption key for homomorphic encryption, and sends the second encryption key to the first apparatus, where the second encryption key is used to synthesize a third encryption key. Therefore, the third encryption key is used for encryption. For example, the encrypted label distribution information is determined based on the third encryption key. The second decryption key is used for decryption. Further, the second apparatus further receives the third encryption key sent by the first apparatus. Therefore, the second apparatus may also perform encryption based on the third encryption key. This solution corresponds to the public key synthesis technology.

In a possible design, that the second apparatus determines the intermediate parameter corresponding to the first segmentation policy based on the encrypted intermediate parameter corresponding to the first segmentation policy and decrypted by the first apparatus includes: The second apparatus decrypts, based on the second decryption key, the encrypted intermediate parameter corresponding to the first segmentation policy and decrypted by the first apparatus, to obtain the intermediate parameter corresponding to the first segmentation policy.

In a possible design, that the second apparatus determines the intermediate parameter corresponding to the first segmentation policy based on the encrypted intermediate parameter corresponding to the first segmentation policy and decrypted by the first apparatus includes: The second apparatus decrypts the encrypted intermediate parameter corresponding to the first segmentation policy based on the second decryption key to obtain an encrypted intermediate parameter corresponding to the first segmentation policy and decrypted by the second apparatus; and determines the intermediate parameter corresponding to the first segmentation policy based on the encrypted intermediate parameter corresponding to the first segmentation policy and decrypted by the second apparatus and the encrypted intermediate parameter corresponding to the first segmentation policy and decrypted by the first apparatus.

According to a third aspect, this disclosure provides an apparatus. The apparatus is configured to perform any one of the foregoing methods provided in the first aspect to the second aspect.

In a possible design, in this disclosure, the apparatus for training a tree model may be divided into functional modules according to any one of the foregoing methods provided in the first aspect to the second aspect. For example, each functional module may be obtained through division based on a corresponding function, or two or more functions may be integrated into one processing module.

For example, in this disclosure, the apparatus for training a tree model may be divided into a communication module and a processing module based on functions. It should be understood that the communication module may be further divided into a sending module and a receiving module, which are respectively configured to implement a corresponding sending function and a corresponding receiving function. For descriptions of possible technical solutions executed by the foregoing divided functional modules and beneficial effects of the technical solutions, refer to the technical solutions according to the first aspect or the corresponding possible designs of the first aspect, and the technical solutions according to the second aspect or the corresponding possible designs of the second aspect. Details are not described herein again.

In another possible design, the apparatus for training a tree model includes a memory and a processor. The memory is coupled to the processor. The memory is configured to store instructions. The processor is configured to invoke the instructions, to perform the method according to the first aspect or the corresponding possible designs of the first aspect, and the method according to the second aspect or the corresponding possible designs of the second aspect. It should be understood that the processor may have a receiving and sending function. In a possible design, the apparatus for training a tree model further includes a transceiver, configured to perform information receiving and sending operations in the foregoing method.

According to a fourth aspect, this disclosure provides a computer-readable storage medium, configured to store a computer program. The computer program includes instructions used to perform the method according to any one of the possible implementations in the foregoing aspects.

According to a fifth aspect, this disclosure provides a computer program product, including instructions used to perform the method according to any one of the possible implementations in the foregoing aspects.

According to a sixth aspect, this disclosure provides a chip, including a processor. The processor is configured to invoke, from a memory, a computer program stored in the memory and run the computer program, and execute instructions used to perform the method according to any one of the possible implementations in the foregoing aspects.

In this case, the sending action in the first aspect or the second aspect may be specifically replaced with sending under control of the processor, and the receiving action in the first aspect or the second aspect may be specifically replaced with receiving under control of the processor.

According to a seventh aspect, this disclosure provides a system for training a tree model. The system includes a first apparatus and a second apparatus. The first apparatus is configured to perform the method according to the first aspect or the corresponding possible designs of the first aspect, and the second apparatus is configured to perform the method according to the second aspect or the corresponding possible designs of the second aspect.

In this disclosure, a name of any apparatus above does not constitute any limitation on the devices or functional modules. During actual implementation, these devices or functional modules may have other names. Each device or functional module falls within the scope defined by the claims and their equivalent technologies in this disclosure, provided that a function of the device or functional module is similar to that described in this disclosure.

These aspects or other aspects in this disclosure are more concise and comprehensible in the following descriptions.

BRIEF DESCRIPTION OF THE DRAWINGS

FIG. 6A-1 and FIG. 6A-2 and FIG. 6B-1 and FIG. 6B-2 show a flowchart of another method for training a tree model according to an embodiment of this disclosure;

FIG. 7A-1 and FIG. 7A-2 and FIG. 7B show a flowchart of another method for training a tree model according to an embodiment of this disclosure;

DETAILED DESCRIPTION OF ILLUSTRATIVE EMBODIMENTS

For ease of understanding of this disclosure, some terms and technologies used in embodiments of this disclosure are first described below.

(1) Machine Learning and Machine Learning Model

The machine learning means parsing data by using an algorithm, learning from the data, and making a decision and prediction on an event in the real world. The machine learning is performing "training" by using a large amount of data, and learning, from the data by using various algorithms, how to complete a model service.

In some examples, the machine learning model is a file that includes algorithm implementation code and parameters for completing a model service. The algorithm implementation code is used to describe a model structure of the machine learning model, and the parameters are used to describe an attribute of each component of the machine learning model.

In some other examples, the machine learning model is a logical function module for completing a model service. For example, a value of an input parameter is input into the machine learning model to obtain a value of an output parameter of the machine learning model.

Machine learning models include artificial intelligence (AI) models, such as tree models.

(2) Tree Model

The tree model is also referred to as a decision tree model. The tree model uses a tree structure and implements final classification through layer-by-layer inference.

Figure 1:
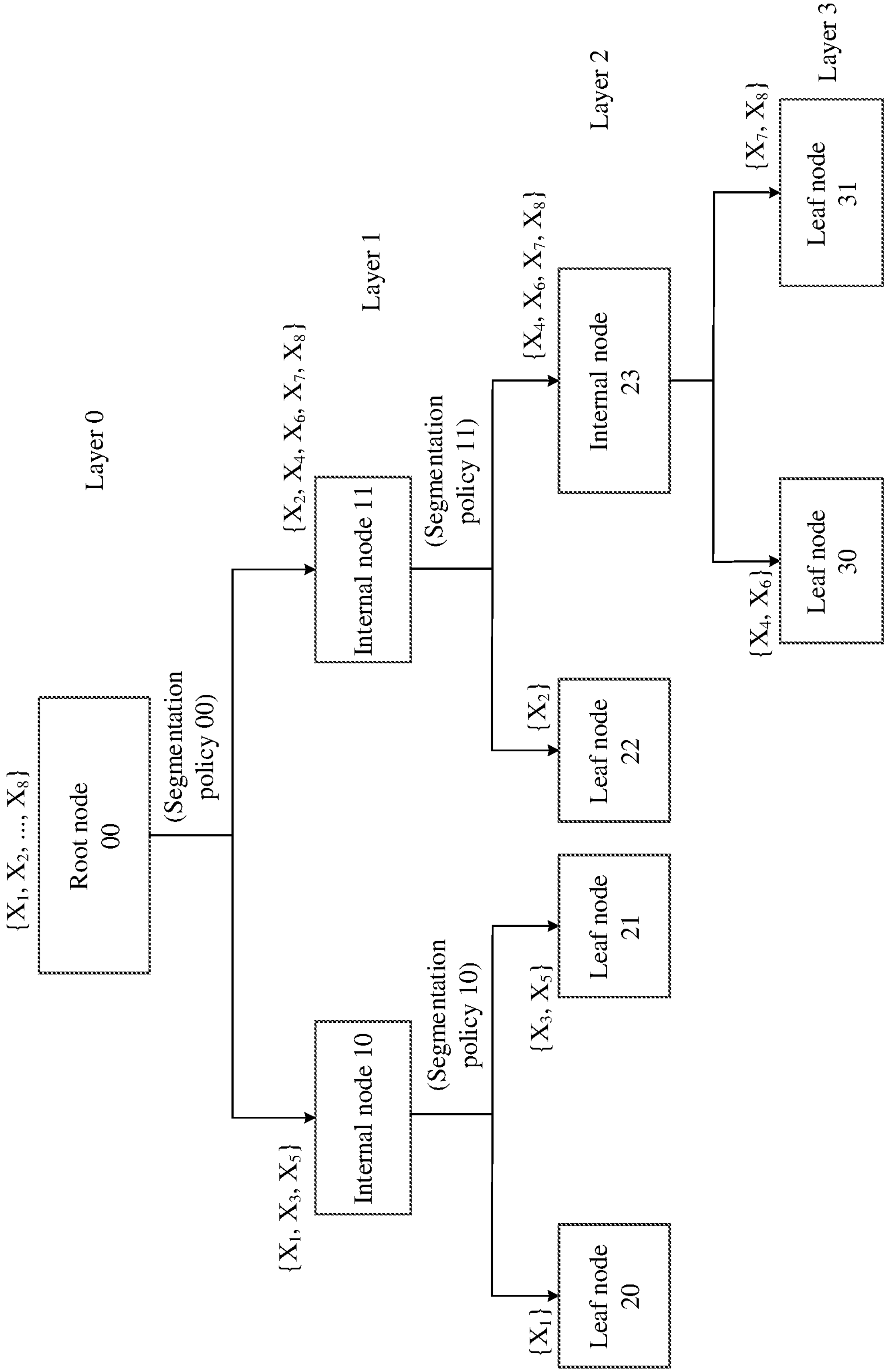
FIG. 1 is a schematic diagram of a tree model according to an embodiment of this disclosure.

FIG. 1 shows a basic tree model. The basic tree model specifically includes the following elements: a root node (which may also be referred to as a decision node), an internal node (which may also be referred to as an opportunity node), a leaf node (which may also be referred to as a termination point), and a connection between nodes. The root node and the internal node include respective segmentation policies. A segmentation policy of a node (a root node and/or an internal node) refers to a feature and a value of the feature, and is used to determine a next-layer node to which data reaching the node is to be sent. The segmentation policy may also be referred to as a parameter of a tree model. For example, when the node predicts a sample, the segmentation policy of the node is a feature 1 and a value of the feature 1. A feature value of a feature 1 of the sample is compared with the feature value of the feature 1 of the segmentation policy. If the feature value of the feature 1 of the sample is less than the feature value of the feature 1 of the segmentation policy, a left subtree is selected for the sample to continue inference. Otherwise, a right subtree is selected for the sample to continue inference. The leaf node indicates a predicted classification result, namely, a label of the sample. For example, if the sample finally reaches a leaf node 1, the predicted classification result of the sample is a classification result indicated by the leaf node 1. The classification result is an output of the sample in the tree model.

There are many methods for building a tree model, but all of them can be summarized as how to determine a segmentation policy for each node (other than a leaf node) in the tree model. When the tree model is constructed, a preferred segmentation policy for each node is selected from top to bottom for each node at each layer starting from the root node. If a node reaches a preset standard (for example, the node reaches a specified depth, or a data set purity of the node reaches a threshold), the node is set as a leaf node. It should be understood that construction of the tree model may also be referred to as training of the tree model.

Based on the basic tree model, a plurality of integrated tree models may be constructed based on an ensemble learning idea, for example, a gradient boosted decision tree (GBDT), a random forest, an extreme gradient boosting (XGBoost) tree, and a light gradient boosting machine (LightGBM). The ensemble learning idea is to use a plurality of basic tree models to enhance a fitting capability of a single tree model. Therefore, the technical solutions in this disclosure may be applied to a plurality of tree models. This is not limited in this disclosure.

(3) Vertical Federated Learning

Vertical federated learning (also referred to as Heterogenous Federated Learning) is a technology of federated learning performed when each party has different feature spaces. During vertical federated learning, model training may be performed based on data of a same sample with different features in different entities. For example, the tree model is trained based on data of a same user group with different user features in different entities. A data feature may also be referred to as a data attribute.

(4) Homomorphic Encryption

Homomorphic encryption is an encryption form, and allows a specific form of operation (for example, addition and multiplication) to be performed on ciphertext to obtain a still encrypted result. A decryption key in a homomorphic key pair is used to decrypt an operation result of homomorphic encrypted data. The operation result is the same as that of plaintext.

(5) Public Key

The public key is an encryption key for homomorphic encryption.

(6) Private Key.

The private key is a decryption key for homomorphic encryption.

(7) Public Key Synthesis Technology

The public key synthesis technology (which may also be referred to as a distributed public key synthesis technology) refers to a technology in which multiple parties participate in public key synthesis. The technology allows the multiple parties to separately generate a public-private key pair, aggregate the public keys of the parties, and synthesize the public keys to obtain a synthesized public key. In this way, the synthesized public key is used when encryption is performed, and the multiple parties decrypt the ciphertext based on the private key generated by the multiple parties when decryption is performed, to obtain corresponding plaintext.

Figure 2:
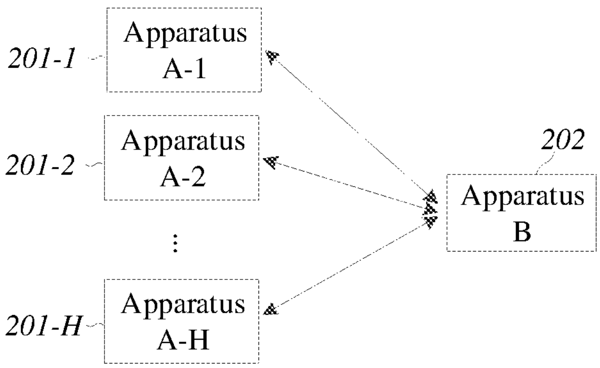
FIG. 2 is a schematic diagram of a possible system architecture according to an embodiment of this disclosure.

FIG. 2 is a schematic diagram of a system architecture to which an embodiment of this disclosure is applicable. The system architecture may include at least one apparatus A 201 and an apparatus B 202. The apparatus A may perform data communication with the apparatus B, to implement vertical federated learning. In this disclosure, a tree model is used for vertical federated learning. A set of samples used for constructing a tree model is referred to as a sample set. The sample set is also a sample set corresponding to a root node of the tree model. The sample set is divided into a plurality of sample subsets at each internal node based on a segmentation policy, until each final sample subset is formed at each leaf node.

The apparatus A has a feature data subset A ($D^A$) of a sample set. The apparatus B has a feature data subset B ($D^B$) of the sample set, and a label set (Y) of the sample set. In this disclosure, one apparatus A is used as an example for description. It should be understood that when there are a plurality of apparatuses A, this is similar. This is not limited in this disclosure. For example, an apparatus A-1 has a feature data subset A-1 ($D^{A-1}$) of a sample set. An apparatus A-2 has a feature data subset A-2 ($D^{A-2}$) of the sample set, and the like. In addition, the apparatus A does not have a label set, but the apparatus B has the label set. Therefore, the apparatus A may also be referred to as an unlabeled party, and the apparatus B may also be referred to as a labeled party. In this disclosure, the apparatus A may also be referred to as a first apparatus, and the apparatus B may also be referred to as a second apparatus.

From a model dimension, the apparatus B and the apparatus A construct tree models with different parameters (segmentation policies). In a process of constructing the tree model, for a same node at a same layer of the tree models of the apparatus B and the apparatus A, the apparatus B and the apparatus A separately traverse segmentation policies formed based on feature data of the apparatus B and the apparatus A, and determine a gain of each segmentation policy based on a segmentation result of each segmentation policy for a sample subset belonging to the node and a label value of the sample subset of the node, to determine a preferred segmentation policy based on the gain of each segmentation policy. If the preferred segmentation policy is on the apparatus A side, the apparatus A adds the preferred segmentation policy to a node of a tree model A of the apparatus A, and sends a segmentation result of the preferred segmentation policy for the sample subset to the apparatus B, so that the apparatus A and the apparatus B determine a sample subset of a next-layer child node of the node based on the segmentation result, and continue to train the child node. If the preferred segmentation policy is on the apparatus B side, the apparatus B adds the preferred segmentation policy to a node of a tree model B of the apparatus B, and sends a segmentation result of the preferred segmentation policy for the sample subset to the apparatus A, so that the apparatus A and the apparatus B determine a sample subset of the child node based on the segmentation result, and continue to train the child node. When the child node reaches a preset standard, the training on the child node is stopped, and the child node is used as a leaf node.

When a tree model is constructed, for a node, the apparatus A also needs to determine a sample subset belonging to the node (that is, determine which samples belong to the node), to determine a segmentation result of the segmentation policy of the apparatus A side for the sample subset belonging to the node (that is, determine a sample subset belonging to a next-layer child node of the node), and further determine a gain of the segmentation policy of the apparatus A side. If the apparatus A obtains a distribution status (that is, which node samples in the sample set belong to) of the sample set on the node, label data of the sample set may be inferred, causing a security risk of label data leakage.

In the solution provided in this disclosure, the apparatus A determines an encrypted intermediate parameter corresponding to the segmentation policy A based on encrypted label distribution information of a first node (any non-leaf node in the tree model) and a segmentation result of the segmentation policy A of the apparatus A for each sample in the sample set. The encrypted intermediate parameter can be used to determine the gain of the segmentation policy A. Therefore, the apparatus A, as an unlabeled party, does not need to obtain a distribution status of the sample set for the first node, and the gain of the segmentation policy A can also be calculated. The apparatus B receives the encrypted intermediate parameter corresponding to the segmentation policy A to obtain the gain of the segmentation policy A. In addition, the apparatus B, as a labeled party, may calculate a gain of a segmentation policy B of the apparatus B in a plaintext or ciphertext state, and then compare the gain of the segmentation policy B with the gain of the segmentation policy A to determine the preferred segmentation policy. Further, this disclosure further proposes another method (for example, encrypting data after packaging, introducing noise, and using a public key synthesis technology). For specific technical details, refer to descriptions in the following method embodiments. Details are not described herein again.

Figure 3A:
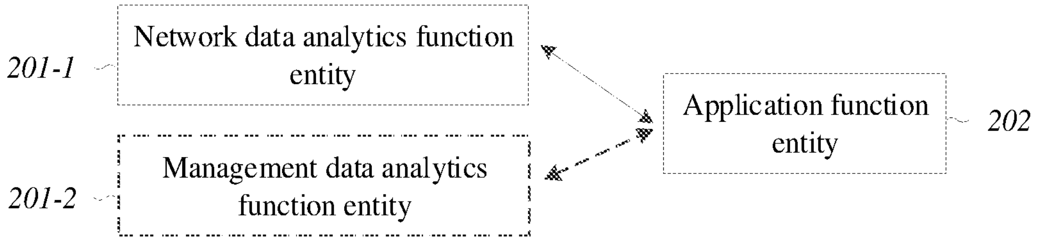
FIG. 3A is a schematic diagram of another possible system architecture according to an embodiment of this disclosure.

FIG. 3A is a schematic diagram of a specific possible system architecture to which an embodiment of this disclosure is applicable. The system may include a network data analytics function entity 201-1 and an application function entity 202. The system may further include a management data analytics function entity 201-2. It should be understood that the network data analytics function entity 201-1 and the management data analytics function entity 201-2 in FIG. 3A may be the apparatus A in this disclosure, and the application function entity 202 in FIG. 3A may be the apparatus B in this disclosure.

The network data analytics function (NWDAF) entity 201-1 may obtain data (for example, related data such as a network load) from each network entity such as a base station or a core network function entity, and perform data analysis to obtain a feature data subset A-1. For example, data included in the feature data subset A-1 is a network load feature data set corresponding to a service flow set.

The management data analytics function (MDAF) entity 201-2 may obtain data (for example, related data such as a network capability) from each network entity such as a base station or a core network function entity, and perform data analysis to obtain a feature data subset A-2. For example, data included in the feature data subset A-2 is a network capability feature data set corresponding to a service flow set.

The application function (AF) entity 202 is configured to provide a service or perform routing of application-related data. The application function entity 202 is further configured to obtain application layer-related data, and perform data analysis to obtain a feature data subset B. For example, data included in the feature data subset B is an application feature data set corresponding to a service flow set. In addition, the application function entity 202 is further configured to obtain service flow experience data corresponding to the service flow set. The service flow experience data may be encoded to obtain a label set corresponding to the service flow set.

It should be understood that the network data analytics function entity 201-1, the management data analytics function entity 201-2, and the application function entity 202 may have data related to different service flows, and an intersection set of the service flows is obtained, to obtain a service flow set (namely, a sample set) used for training.

The network data analytics function entity 201-1, the management data analytics function entity 201-2, and the application function entity 202 may jointly participate in vertical federated learning to obtain a tree model for predicting service flow experience. For a specific training process, refer to descriptions of other embodiments of this disclosure. Details are not described herein again.

It should be understood that the segmentation policy of each non-leaf node in the trained tree model may be formed by a feature of the network data analytics function entity 201-1, a feature of the management data analytics function entity 201-2, or a feature of the application function entity 202. For example, for a tree model node A that has been trained, the preferred segmentation policy is the feature of the network data analytics function entity 201-1. In this case, a node A-1 in a tree model 1 in the network data analytics function entity 201-1 stores the preferred segmentation policy, a node A-2 in a tree model 2 of the management data analytics function entity 201-2 indicates that a preferred policy of the node is on the network data analytics function entity 201-1 side, and a node A-3 in a tree model 3 of the application function entity 202 indicates that a preferred policy of the node is on the network data analytics function entity 201-1 side. Therefore, when the tree model is used for prediction, the preferred segmentation policy of the node A-1 is used to predict a to-be-predicted service flow, and sends a prediction result (for example, information indicating that the to-be-predicted service flow is segmented to a right child node of the node A-1) to the network data analytics function entity 201-1 and the application function entity 202, to continue to perform prediction on the right child node of the node A. It may also be learned that, after the training is completed, the network data analytics function entity 201-1, the management data analytics function entity 201-2, and the application function entity 202 respectively store the tree model 1, the tree model 2, and the tree model 3, and the tree model 1, the tree model 2, and the tree model 3 all participate in prediction. Therefore, the tree model 1, the tree model 2, and the tree model 3 may be referred to as several submodels of the tree model (in other words, the tree model 1, the tree model 2, and the tree model 3 each are a part of the tree model). This is not limited in this disclosure. Other application scenarios are similar. Details are not described again.

It should be understood that, in different training scenarios, roles of these function entities in training may alternatively be switched. For example, the network data analytics function entity 201-1 has a label set that represents network performance. In this case, the network data analytics function entity 201-1 is used as a label party and corresponds to the apparatus B. A person skilled in the art can apply the technical solutions of this disclosure to different training scenarios.

Figure 3B:
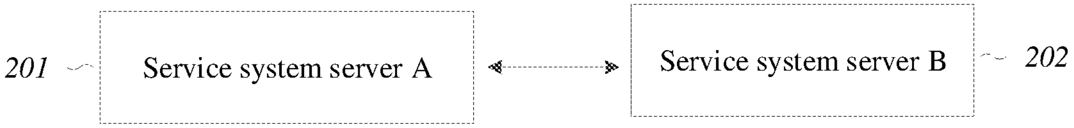
FIG. 3B is a schematic diagram of another possible system architecture according to an embodiment of this disclosure.

FIG. 3B is a schematic diagram of another specific possible system architecture to which an embodiment of this disclosure is applicable. The system may include a service system server A 201 and a service system server B 202. It should be understood that the service system server A 201 in FIG. 3B may be the apparatus A in this disclosure, and the service system server B 202 in FIG. 3B may be the apparatus B in this disclosure.

The service system server A and the service system server B may be servers applied to different service systems. For example, the service system server A is a server of an operator service system, and the service system server B is a server of a banking service system. The service system server A is configured to store data of a user group A based on a service A. The service system server B is configured to store data of a user group B based on a service B. The user group A and the user group B have an intersection user group AB. Users in the user group AB belong to both the user group A and the user group B. The user group AB is used as a sample set. The service system server A and the service system server B jointly perform vertical federated learning. In the learning process, the service system server A uses the stored user data based on the service A (a feature data subset A), and the service system server B uses the stored user data based on the service B (a feature data subset B) and user label data (a label set).

Table 2 is a schematic table of sample data in an example in which the service system server A is a server of an operator service system and the service system server B is a server of a banking service system.

TABLE 2

| Row number | Data | Data source | Description |
|---|---|---|---|
| 1 | Status | Banking service system | Whether breached |
| 2 | Age | Banking service system | Age |
| 3 | Job | Banking service system | Vocation |
| 4 | Sex | Banking service system | Gender |
| 5 | Operation | Banking service system | Collections from other banks |
| 6 | Balance | Banking service system | Saving account balance |
| 7 | Amount | Banking service system | Consumption amount |
| 8 | Order_num | Banking service system | Number of Transactions |
| 9 | Days | Banking service system | Days to payment date |
| 10 | Arrears | Operator service system | Whether service is suspended due to arrears |
| 11 | Call nums | Operator service system | Number of calls |
| 12 | Communication flows | Operator service system | Traffic consumption |
| 13 | Call nums vs last month | Operator service system | Change ratio of the number of calls to that in the last month |
| 14 | Communication_flows vs last month | Operator service system | Change ratio of traffic consumption to that in the last month |

Data in row 1 (namely, status, user label data) is used as a label set for model training. Data in rows 1 to 9 is data obtained by the server of the banking service system, and may be used as a feature data subset B corresponding to the apparatus B. Data in rows 10 to 14 is data obtained by the operator service system, and may be used as a feature data subset A corresponding to the apparatus A. Data in rows 1 to 14 is data of a same user (namely, a same sample) in the user group AB in different systems. The service system server A and the service system server B jointly perform vertical federated learning based on the foregoing data. For a specific learning process, refer to descriptions in other embodiments of this disclosure. Details are not described herein again.

To better describe the technical solutions of this disclosure, some data and parameters in tree model training (vertical federated learning) are described herein.

The apparatus A has a feature data subset A ($D^A$) of a sample set. The apparatus B has a feature data subset B ($D^B$) of the sample set, and a label set (Y) of the sample set.

If the sample set includes P samples (P is an integer greater than or equal to 1), the feature data subset A, the feature data subset B, and the label set Y each include P pieces of data (for example, data of P users). Correspondingly, the feature data subset A is $$D^A = [d_1^A, d_2^A, d_3^A, \dots, d_p^A, \dots, d_P^A]^T,$$

and the feature data subset B is $$D^B = [d_1^B, d_2^B, d_3^B, \dots, d_p^A, \dots, d_P^B]^T,$$

where p is any positive integer less than or equal to P.

The feature data subset A includes N features (N is an integer greater than or equal to 1), and the feature data subset B includes M features (M is an integer greater than or equal to 1). Therefore, a feature $F_A$ of the apparatus A is $F_A=\{f_1, f_2, \dots, f_N\}$, and a feature $F_B$ of the apparatus B is $F_B=\{f_{N+1}, f_{N+2}, \dots, f_{N+M}\}$, where $f_N$ represents an $N^{th}$ feature, and $f_{N+M}$ represents an $(N+M)^{th}$ feature. Therefore, feature data of a $p^{th}$ sample in the feature data subset A is represented as $$d_p^A = [d_p^{f1}, d_p^{f2}, \dots, d_p^{fN}].$$

Correspondingly, feature data of a $p^{th}$ sample in the feature data subset B is represented as $$d_p^B = [d_p^{fN+1}, d_p^{fN+2}, \dots, d_p^{fN+M}].$$

The label set Y also includes P pieces of data: $Y=\{y_1, y_2, \dots, y_p, \dots, y_P\}$. The label value may represent a classification result of the sample, or the label value represents an encoded classification result, so that the label value can be calculated during model training. For example, the label value of a trusted user is +1, and the label value of a non-trusted user is −1. Generally, in a case of binary classification (which means two types of classification results), the label set Y may be represented by a vector: $Y=[y_1, y_2, \dots, y_p, \dots, y_P]$, where a value of $y_p$ may be +1 or −1, and a specific value is determined based on a classification result. For a case of multiple classification (which generally means more than two classification results), one-hot encoding may be used, and the label set Y is specifically represented as follows:

$$Y = \begin{bmatrix} y_1^0 & y_P^0 \\ \vdots & \vdots \\ y_1^C & y_P^C \end{bmatrix}$$

C represents a type of a classification result, and C is an integer greater than 2. c is any positive integer less than or equal to C. A value of $$y_p^c$$

may be 0 or 1. Specifically, when a category of a sample $$y_p^c$$

is a $c^{th}$ type of a classification result, the value is 1; or when a category of a sample $$y_p^c$$

is not a $c^{th}$ type of a classification result, the value is 0. Any row in the label set Y may be represented as $$Y^c = [y_1^c, y_2^c, \dots, y_p^c, \dots, y_P^C].$$

It should be understood that binary classification may also be used as a special case of multiple classification (for example, C=2). In this case, the foregoing encoding method for multiple classification may also be used for binary classification. This is not limited in this disclosure. In addition, a tree model for multiple classification may also be segmented into a plurality of tree models for binary classification for training, and a sample of each tree model corresponds to two classification results. This is not limited in this disclosure.

The tree model is further described herein.

(1) Layer The tree model has a hierarchical structure (as shown in FIG. 1. For example, the tree model starts from a root node at a layer 0 sequentially to the bottom).

(2) Node Each layer of the tree is composed of nodes. An identifier (also referred to as an index) of each layer of nodes in the tree can increase sequentially from left to right. In this disclosure, v represents an identifier of a node. It should be understood that a method for numbering a layer and a node is not limited in this disclosure. FIG. 1 is merely an example.

When the tree model is constructed, samples in a sample set are segmented to different nodes as the nodes are constructed layer by layer. For a first node (any non-leaf node in the tree model), a sample belonging to the first node is a sample that is segmented to the first node based on a segmentation policy of each upper-layer node of the first node, and the sample belonging to the first node forms a sample subset of the first node. Whether a sample belongs to the first node is determined based on the segmentation policy of each upper-layer node of the first node, or may be considered as a segmentation result of the segmentation policy of each upper-layer node of the first node. Particularly, when the first node is a root node, the root node has no upper-layer node, and all sample sets belong to the root node.

The tree model shown in FIG. 1 is used as an example. A sample set includes $\{X_1, X_2, \dots, X_8\}$ (in other words, the sample set includes 8 samples, and P=8). A root node 00 is an initial node, and all sample sets are located on the root node 00. In other words, all 8 samples belong to the root node 00, and the 8 samples form a sample subset of the root node 00 (due to particularity of the root node, the sample subset of the root node 00 is a sample set). When a preferred policy of the root node 00 is determined, segmentation policies are traversed, so that a segmentation policy 00 with an optimal gain is selected from the segmentation policies as the preferred policy of the root node. Further, based on the segmentation policy 00, the sample set of the root node 00 is segmented into a sample subset $\{X_1, X_3, X_5\}$ of an internal node 10 and a sample subset $\{X_2, X_4, X_6, X_7, X_8\}$ of an internal node 11. The following conclusion is obtained:

Samples $X_1$, $X_3$, and $X_5$ segmented into the internal node 10 in the sample set of the root node 00 belong to the internal node 10, and samples $X_2$, $X_4$, $X_6$, $X_7$, and $X_8$ segmented into the internal node 11 in the sample set of the root node 00 belong to the internal node 11. This is also a result of the segmentation policy 00 for each sample in the sample set.

For the internal node 10, a segmentation policy 10 with an optimal gain is selected for the internal node 10 as a preferred policy of the internal node 10. Further, based on the segmentation policy 10, the sample subset of the internal node 10 is segmented into a sample subset $\{X_1\}$ of a leaf node 20 and a sample subset $\{X_3, X_5\}$ of a leaf node 21. The following conclusion may be obtained: A sample $X_1$ segmented into the leaf node 20 in the sample subset of the internal node 10 belongs to the leaf node 21, and samples $X_3$ and $X_5$ segmented into the leaf node 21 in the sample subset of the root node 00 belong to the leaf node 20. It should be understood that the sample $X_1$ belongs to the leaf node 20. This is a result of a joint action of the segmentation policy 10 of an upper-layer node (the internal node 10) of the leaf node 20 and the segmentation policy 00 of an upper-layer node (the root node 00) of the internal node 10. If the segmentation policy 10 is considered only, a segmentation result of the segmentation policy 10 for each sample in the sample set $\{X_1, X_2, \ldots, X_8\}$ may be that the samples $X_1$, $X_2$, and $X_8$ are segmented into the leaf node 20, and the samples $X_3$, $X_4$, $X_5$, $X_6$, and $X_7$ are segmented into the leaf node 21. Therefore, the segmentation policy 10 segments a sample in the sample set to a node, but the sample does not necessarily belong to the node.

Specifically, a digit symbol may indicate whether a sample belongs to the first node. For example, a non-zero character (for example, 1) indicates that the sample belongs to the first node, and a character 0 indicates that the sample is deployed on the first node. Distribution information of the sample set for the first node includes indication data (namely, the foregoing digital symbol) indicating whether each sample in the sample set belongs to the first node. The first node is denoted as a node v, the distribution information of the sample set for the first node is denoted as $$S^v\text{, and } S^v = [s_1^v, \ldots, s_p^v, \ldots, s_P^v].$$

If a sample p is on the node $$v, s_p^v$$

is set to a non-zero character (for example, 1), or set to a character 0. FIG. 1 is used as an example. Distribution information of the root node is $S^{00}=[1,1,1,1,1,1,1,1]$, and distribution information of the internal node 10 is $S^{10}=[1,0,1,0,1,0,0,0]$. It should be understood that when the non-zero character is 1, $S^v$ of the root node is a vector of all is.

Figure 4A:
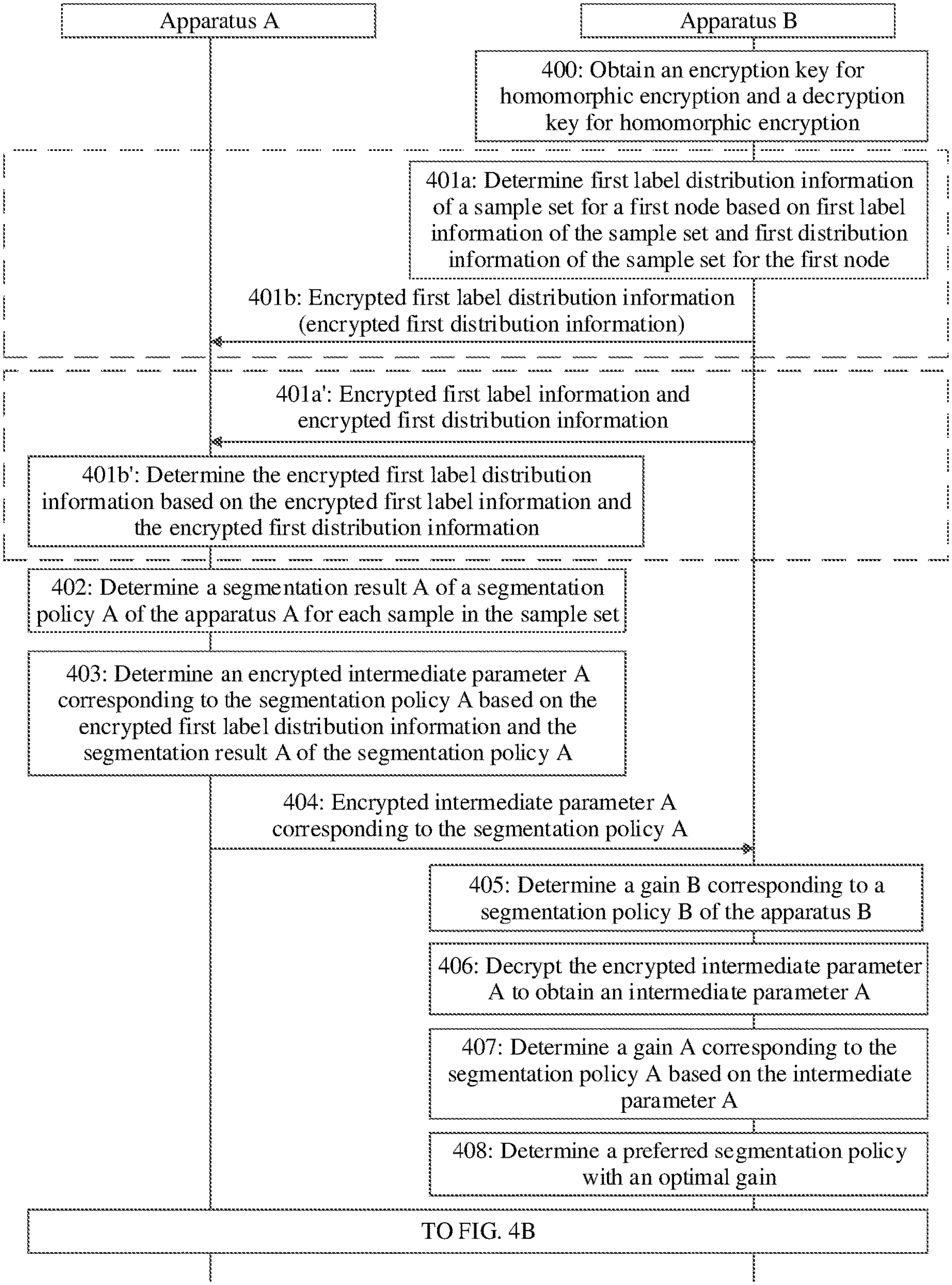
FIG. 4A and FIG. 4B show a flowchart of a method for training a tree model according to an embodiment of this disclosure.
Figure 4B:
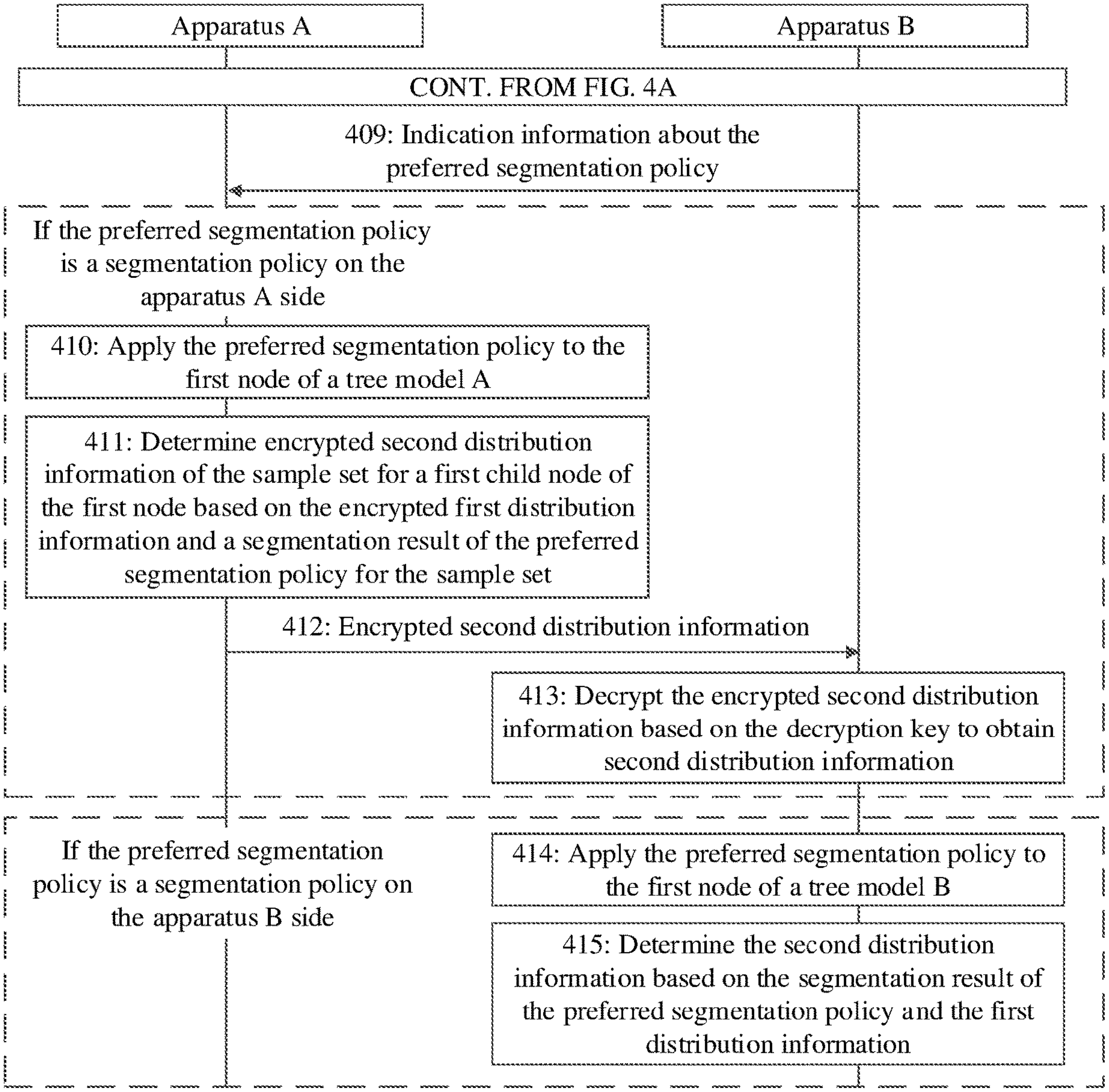

FIG. 4A and FIG. 4B show a method for training a tree model in a vertical federated learning scenario according to an embodiment of this disclosure. The method may be applied to application scenarios such as FIG. 2, FIG. 3A, and FIG. 3B. Specific steps are as follows:

400: An apparatus B obtains an encryption key (pk) for homomorphic encryption and a decryption key (sk) for homomorphic encryption.

The encryption key may also be referred to as a public key, and the decryption key may also be referred to as a private key. The encryption key (pk) of the apparatus B may be obtained in multiple manners. Optionally, the apparatus B generates the encryption key (pk) for homomorphic encryption and the decryption key (sk) for homomorphic encryption. Optionally, a public key synthesis technology is used. To be specific, multiple parties (including an apparatus A and the apparatus B) participating in vertical federated learning synthesize a public key (in other words, the encryption key (pk) is obtained through synthesis by the multiple parties). For a specific method of the public key synthesis technology, refer to the description of step 600 in the embodiment shown in FIG. 6A-1 and FIG. 6A-2. Details are not described herein again.

401*a*: The apparatus B determines first label distribution information of a sample set for a first node based on first label information of the sample set and first distribution information of the sample set for the first node.

The first node is any non-leaf node (for example, a root node or an internal node) in the tree model.

The apparatus B determines the first label information of the sample set based on a label set (namely, a label value of each sample) of the sample set. The first label information of the sample set includes label data of each sample in the sample set. In an optional manner, the label data of each sample is a label value of the sample, and the first label information is the label set. For example, the first label information is represented as $Y=[y_1, y_2, \ldots, y_p, \ldots, y_P]$. In another optional manner, the label data of each sample is obtained through calculation based on a label value of the sample. An XGBoost algorithm is used as an example for description. The first label information is represented as a residual of a predicted label value of a previous tree and a real label value for each sample in the sample set, and is specifically represented as follows:

$$G = [y_1' - y_1, y_2' - y_2, \ldots, y_p' - y_p, \ldots, y_P' - y_P]$$

$$H = [y_1'(1 - y_1'), y_2'(1 - y_2'), \ldots, y_p'(1 - y_p'), \ldots, y_P'(1 - y_P')]$$

$y_p$ is the real label value of the sample, and $$y_p'$$

is the predicted label value of the previous tree. It should be understood that, if a value $$y_p'$$

of a first tree in this training is 0, H is an all-zero value and may be ignored. In this case, the residual is the real label value.

The apparatus B determines the first distribution information of the sample set for the first node, where the first distribution information includes indication data indicating whether each sample belongs to the first node. For details, refer to the foregoing description. Details are not described herein again. If the first node is a root node, the apparatus B directly determines the first distribution information, for example, determines that the first distribution information is an all-1 vector. If the first node is not a root node, the apparatus B loads the first distribution information from a cache. Specifically, the first distribution information of the first node is determined based on information such as distribution information of an upper-layer node of the first node and/or a preferred segmentation policy. After training of the upper-layer node of the first node is completed, the apparatus B caches the first distribution information of the first node for training of the first node. For a method for determining the first distribution information of the first node, refer to a method for determining second distribution information of a child node of the first node described below. The method is similar, for example, steps 413 and 415.

The apparatus B determines the first label distribution information of the sample set for the first node based on the first label information of the sample set and the first distribution information of the sample set for the first node. Specifically, the first label information is multiplied by the first distribution information by element. In an optional manner, the first label distribution information is represented as $$Y^v = Y \cdot S^v = [y_1^v, y_2^v, \dots, y_p^v, \dots, y_P^v].$$

In another optional manner, the first label distribution information is represented as $$G^v = G \cdot S^v = [g_1^v, g_2^v, \dots, g_p^v, \dots, g_P^v],$$

and $$H^v = H \cdot S^v = [h_1^v, h_2^v, \dots, h_p^v, \dots, h_P^v]$$

For a sample that does not belong to the first node in the first distribution information, $$s_p^v = 0,$$

and for a sample that does not belong to the first node in the first label distribution information, $$y_p^v = 0.$$

Therefore, when the first label distribution information is used to calculate an intermediate parameter of a gain and/or the gain subsequently, label data of the sample that does not belong to the first node does not affect.

Further, the apparatus B encrypts the first label distribution information based on the encryption key (pk) for homomorphic encryption to obtain encrypted first label distribution information of the sample set for the first node, for example, $[\![Y^v]\!]$ or $[\![G^v]\!]$, $[\![H^v]\!]$.

$$[\![Y^v]\!] = [[\![y_1^v]\!], [\![y_2^v]\!], \dots, [\![y_p^v]\!], \dots, [\![y_P^v]\!]]$$

$$[\![G^v]\!] = [[\![g_1^v]\!], [\![g_2^v]\!], \dots, [\![g_p^v]\!], \dots, [\![g_P^v]\!]]$$

-continued $$[\![H^v]\!] = [[\![h_1^v]\!], [\![h_2^v]\!], \dots, [\![h_p^v]\!], \dots, [\![h_P^v]\!]]$$

$[\![\ ]\!]$ represents encrypted, and specifically represents homomorphic encryption in this disclosure.

In an optional manner, the apparatus B determines the encrypted first label distribution information based on encrypted first label information and encrypted first distribution information. Specifically, the apparatus B may separately encrypt the first label information and the first distribution information based on the encryption key (pk) to obtain the encrypted first label information (for example, $[\![Y]\!]$ or $[\![G]\!]$, $[\![H]\!]$) and the encrypted first distribution information $[\![S^v]\!]$, and further determine the encrypted first label distribution information of the sample set for the first node based on the encrypted first label information and the encrypted first distribution information (for example, the two are multiplied by element). In addition, the apparatus B may further determine the encrypted first label distribution information based on the encrypted first label information and the first distribution information, or the apparatus B may further determine the encrypted first label distribution information based on the first label information and the encrypted first distribution information. This is not limited in this disclosure, and finally the first label distribution information in ciphertext is obtained.

401*b*: The apparatus B sends, to the apparatus A, the encrypted first label distribution information of the sample set for the first node.

In this way, the apparatus A obtains the encrypted first label distribution information.

Optionally, the apparatus B further sends, to the apparatus A, the encrypted first distribution information of the sample set for the first node, so that the apparatus A obtains the encrypted first distribution information.

401*a* and 401*b* are a manner in which the apparatus A obtains the encrypted first label distribution information. It should be understood that there may be another manner. For example, 401*a*' and 401*b*' are as follows:

401*a*': The apparatus B sends the encrypted first label information and the encrypted first distribution information to the apparatus A.

For a specific method in which the apparatus B determines the encrypted first label information and the encrypted first distribution information, refer to the description of 401*a*. Details are not described again.

401*b*': The apparatus A determines the encrypted first label distribution information based on the encrypted first label information and the encrypted first distribution information.

The apparatus A receives the encrypted first label information and the encrypted first distribution information, and further determines the encrypted first label distribution information. The specific method is not described herein again.

402: The apparatus A determines a segmentation result of a segmentation policy of the apparatus A.

The segmentation policy of the apparatus A may also be referred to as a segmentation policy on the apparatus A side.

The apparatus A may generate the segmentation policy of the apparatus A before training the root node. For example, a plurality of segmentation thresholds are generated for each feature in features $F_A$ of the apparatus A, to generate a segmentation policy set of the apparatus A. For ease of description, the segmentation policy of the apparatus A is briefly referred to as a segmentation policy A. Optionally, the segmentation policy A may also be referred to as a first segmentation policy of the apparatus A, a first segmentation policy A, a second segmentation policy of the apparatus A, a second segmentation policy A, or the like. Further, when each node is trained, the apparatus A uses the segmentation policy A. The apparatus A may alternatively determine the segmentation policy A for the first node before the first node is trained. For example, the apparatus A generates the segmentation policy A for a feature that is not used in the features $F_A$ of the apparatus A and/or a segmentation threshold that is not used, and then uses the segmentation policy A when the first node is trained. It should be understood that the segmentation policy A may be a segmentation policy set, and generally includes two or more segmentation policies, but a case in which there is only one segmentation policy is not excluded. The segmentation policy A may be represented as $R_A=\{r_{1A}, r_{2A}, r_{iA}, \ldots, r_{IA}\}$, where I is a positive integer, i is an identifier (which may also be referred to as an index) of the segmentation policy of the apparatus A, and i is a positive integer less than or equal to I.

Further, the apparatus A determines a segmentation result of the segmentation policy A for each sample in the sample set. Specifically, the apparatus A determines a segmentation result of each of the segmentation policies A for each sample in the sample set. For example, child nodes of the first node are represented as a node 2v and a node 2v+1. Generally, the tree model is bifurcated. In other words, each internal node or root node has two child nodes. It should be understood that the tree model may alternatively be multi-branched. For example, the first node includes three child nodes. This is not limited in this disclosure. A bifurcated tree model is used as an example for description.

The apparatus A determines a segmentation result of the segmentation policy $r_{iA}$ for each sample in the sample set based on the feature data subset A ($D^A$). The segmentation result is represented as follows:

$$W^{A2v} = \left[w_1^{A2v}, \ldots, w_p^{A2v}, \ldots, w_P^{A2v}\right]$$

$$W^{A(2v+1)} = \left[w_1^{A(2v+1)}, \ldots, w_p^{A(2v+1)}, \ldots, w_P^{A(2v+1)}\right]$$

$W^{A2v}$ indicates a segmentation result of the segmentation policy A for segmenting the sample set into the node 2v, and $W^{A(2v+1)}$ indicates a segmentation result of the segmentation policy A for segmenting the sample set into the node 2v+1. If the segmentation policy $r_{iA}$ segments a $p^{th}$ sample into the node 2v, a value of $$w_p^{A2v}$$

is a non-zero value (for example, 1), and a value of $$w_p^{A(2v+1)}$$

is a value 0.

For example, for the segmentation policy (feature: call nums (Call nums), and threshold: 100 times/month), samples whose call nums is greater than 100 in the sample set are segmented into the node 2v. In other words, a value of $$w_p^{A2v}$$

of the samples whose call nums is greater than 100 in $W^{A2v}$ is 1, and a value of $$w_p^{A2v}$$

of the samples whose call nums is less than or equal to 100 in $W^{A2v}$ is 0. Samples whose call nums is less than or equal to 100 are segmented into the node 2v+1. In other words, a value of $$w_p^{A(2v+1)}$$

of the samples whose call nums is less than or equal to 100 in $W^{A(2v+1)}$ is 1, and a value of $$w_p^{A(2v+1)}$$

of the samples whose call nums is greater than 100 in $W^{A(2v+1)}$ is 0.

403: The apparatus A determines an encrypted intermediate parameter corresponding to the segmentation policy A based on the segmentation result of the segmentation policy A and the encrypted first label distribution information.

Specifically, for each of the segmentation policies A, the apparatus A calculates a corresponding encrypted intermediate parameter. The intermediate parameter specifically refers to a parameter for calculating a gain.

In an optional manner, a method for calculating an encrypted intermediate parameter corresponding to a segmentation policy $r_{iA}$ is as follows:

$$[\![C_i^{A2v}]\!] = \sum_{p=1}^{P} [\![y_p^v]\!] w_p^{A2v}$$

$$[\![D_i^{A2v}]\!] = \sum_{p=1}^{P} [\![s_p^v]\!] w_p^{A2v}$$

$$[\![C_i^{A(2v+1)}]\!] = \sum_{p=1}^{P} [\![y_p^v]\!] w_p^{A(2v+1)}$$

$$[\![D_i^{A(2v+1)}]\!] = \sum_{p=1}^{P} [\![s_p^v]\!] w_p^{A(2v+1)}$$

$$[\![C_i^{A2v}]\!], [\![D_i^{A2v}]\!], [\![C_i^{A(2v+1)}]\!], \text{ and } [\![D_i^{A(2v+1)}]\!]$$

are encrypted intermediate parameters corresponding to the segmentation policy $r_{iA}$.

In an optional manner, a method for calculating an encrypted intermediate parameter corresponding to a segmentation policy $r_{iA}$ is as follows:

$$[\![C_i^{A2v}]\!] = \sum [\![g_p^v]\!] w_p^{A2v}$$

$$[\![D_i^{A2v}]\!] = \sum [\![g_p^v]\!] w_p^{A2v}$$

$$[\![C_i^{A(2V+1)}]\!] = \sum [\![h_p^v]\!] w_p^{A(2V+1)}$$

$$[\![D_i^{A(2V+1)}]\!] = \sum [\![h_p^v]\!] w_p^{A(2V+1)}$$

In an optional manner, when the encrypted intermediate parameter is calculated, the segmentation result of the segmentation policy $r_{iA}$ for segmenting the sample set into the node 2v and the node 2v+1 may also be directly calculated through statistics, and a corresponding encrypted intermediate parameter is calculated based on the statistical result. A specific method is not described herein again.

In addition, the foregoing intermediate parameter calculation manner is provided as an example in this disclosure. This is not limited in this disclosure. A person skilled in the art should understand that different intermediate parameter calculation methods may be used for different gain calculation methods and/or different tree model algorithms.

404: The apparatus A sends the encrypted intermediate parameter corresponding to the segmentation policy A to the apparatus B.

405: The apparatus B determines a gain corresponding to a segmentation policy of the apparatus B.

The apparatus B, as a labeled party, may obtain, in a plaintext state, the gain corresponding to the segmentation policy of the apparatus B. In addition, the apparatus B has distribution information of the sample set for the first node. In other words, the apparatus B can determine which samples in the sample set belong to the first node, that is, determine a sample subset of the first node. For ease of description, the sample subset of the first node is briefly referred to as a first sample subset. Therefore, when determining the segmentation result of the segmentation policy of the apparatus B, the apparatus B only needs to consider the first sample subset, and may not consider the entire sample set. It is assumed that the first sample subset includes Q samples, and Q is an integer less than P.

Specific steps are as follows:

(1) The apparatus B determines a segmentation result B of the segmentation policy of the apparatus B for each sample in the first sample subset.

The segmentation policy of the apparatus B may also be referred to as a segmentation policy on the apparatus B side. For the segmentation policy of the apparatus B, refer to the description of the segmentation policy of the apparatus A in 402. A may be replaced with B. Details are not described herein again. For ease of description, the segmentation policy of the apparatus B is briefly referred to as a segmentation policy B. The segmentation policy B may be represented as $R_B=\{r_{1B}, r_{2B}, \ldots, r_{jB}, \ldots, r_{jB}\}$, where J is a positive integer, j is an identifier (which may also be referred to as an index) of the segmentation policy B, and j is a positive integer less than or equal to J.

Further, the apparatus B determines the segmentation result of the segmentation policy B for each sample in the first sample subset. Specifically, the apparatus B determines a segmentation result of each of the segmentation policies B for each sample in the first sample subset.

The apparatus B determines a segmentation result of the segmentation policy $r_{iB}$ for each sample in the first sample subset based on a feature data subset B (specifically, based on feature data of Q samples in the feature data subset B). The segmentation result is represented as follows:

$$W^{B2v} = [w_1^{B2v}, \ldots, w_q^{B2v}, \ldots, w_Q^{B2v}]$$

$$W^{B(2V+1)} = [w_1^{B(2v+1)}, \ldots, w_q^{B(2v+1)}, \ldots, w_Q^{B(2v+1)}]$$

$W^{B2v}$ indicates a segmentation result of the segmentation policy B for segmenting the first sample subset into the node 2v, and $W^{A(2v+1)}$ indicates a segmentation result of the segmentation policy B for segmenting the first sample subset into the node 2v+1.

(2) The apparatus B determines the intermediate parameter corresponding to the segmentation policy B based on the segmentation result of the segmentation policy B and label information of the first sample subset.

Specifically, for each of the segmentation policies B, the apparatus B calculates a corresponding intermediate parameter.

In an optional manner, a method for calculating an intermediate parameter corresponding to a segmentation policy $r_{jB}$ is as follows:

$$C_j^{B2v} = \sum_{q=1}^{Q} y_q w_q^{B2v}$$

$$D_j^{B2v} = \sum_{q=1}^{Q} s_q w_q^{B2v}$$

$$C_j^{B(2v+1)} = \sum_{q=1}^{Q} y_q w_q^{B(2v+1)}$$

$$D_j^{B(2v+1)} = \sum_{q=1}^{Q} s_q w_q^{B(2v+1)}$$

$$C_j^{B2v},\ D_j^{B2v},\ C_j^{B(2v+1)},\ \text{and}\ D_j^{B(2v+1)}$$

are encrypted intermediate parameters corresponding to the segmentation policy $r_{jB}$.

In an optional manner, a method for calculating an encrypted intermediate parameter corresponding to a segmentation policy $r_{jB}$ is as follows:

$$C_j^{B2v} = \sum_{q=1}^{Q} g_q^v w_q^{B2v}$$

$$D_j^{B2v} = \sum_{q=1}^{Q} h_q^v w_q^{B2v}$$

$$C_j^{B(2v+1)} = \sum_{q=1}^{Q} g_q^v w_q^{B(2v+1)}$$

$$D_j^{B(2v+1)} = \sum_{q=1}^{Q} h_q^v w_q^{B(2v+1)}$$

It should be understood that, when the intermediate parameter is calculated, the segmentation result of the segmentation policy $r_{jB}$ for segmenting the first sample subset into the node 2v and the node 2v+1 may also be directly calculated through statistics, and a corresponding intermediate parameter is calculated based on the statistical result. A specific method is not described herein again.

In addition, in (1), the apparatus B may alternatively determine a segmentation result B of the segmentation policy B for each sample in the sample set; and in (2), the apparatus B may alternatively determine the intermediate parameter corresponding to the segmentation policy B based on the segmentation result of the segmentation policy B and first distribution label information of the sample set for the first node. For a specific calculation equation, refer to descriptions of 402 and 403. A is replaced with B, and encrypted is removed. In this case, the apparatus B performs calculation on each sample in the sample set. A calculation equation is similar to that on the apparatus A side, but a calculation amount is increased.

It should be understood that, if homomorphic encryption is performed by using the public key synthesis technology, although the apparatus B is a labeled party, distribution information of the sample set in plaintext cannot be directly obtained in a training process. In this case, similar to the apparatus A, the apparatus B also needs to perform calculation in a ciphertext state to obtain an encrypted intermediate parameter corresponding to the segmentation policy B, so that the apparatus B and the apparatus A jointly decrypt the encrypted intermediate parameter corresponding to the segmentation policy B to obtain the intermediate parameter corresponding to the segmentation policy B in plaintext, to obtain a gain corresponding to the segmentation policy B. For a specific method, refer to the description of step 605 in the embodiment shown in FIG. 6A-1 and FIG. 6A-2. Details are not described herein again.

(3) The apparatus B determines the gain corresponding to the segmentation policy B based on the intermediate parameter corresponding to the segmentation policy B.

A gain of a segmentation policy is a quantized indicator for measuring whether the segmentation policy is good or bad. There may be a plurality of gains (in other words, there may be a plurality of gain calculation methods). For example, the gain is a Gini (Gini) coefficient, an information entropy, and the like. In addition, an information gain ratio may also be used as a quantized indicator for measuring whether the segmentation policy is good or bad. For ease of description, the information gain ratio is also used as a gain in this disclosure. For clarity of description, in this disclosure, the following gain calculation method is provided by using an example in which the Gini coefficient is used as the gain of the segmentation policy B. However, this is not limited in this disclosure. For example, a gain corresponding to the segmentation policy $r_{jB}$ is as follows:

$$Gini = \frac{D_j^{B2v}}{D_j^{B2v}+D_j^{B(2v+1)}}\left(1-\left(\frac{C_j^{B2v}}{D_j^{B2v}}\right)^2-\left(\frac{D_j^{B2v}-C_j^{B2v}}{D_j^{B2v}}\right)^2\right)+ \frac{D_j^{B(2v+1)}}{D_j^{B2v}+D_j^{B(2v+1)}}\left(1-\left(\frac{C_j^{B(2v+1)}}{D_j^{B(2v+1)}}\right)^2-\left(\frac{D_j^{B(2v+1)}-C_j^{B(2v+1)}}{D_j^{B(2v+1)}}\right)^2\right)$$

406: The apparatus B decrypts the encrypted intermediate parameter corresponding to the segmentation policy A to obtain an intermediate parameter corresponding to the segmentation policy A.

The apparatus B receives the encrypted intermediate parameters $$([\![C_i^{A2v}]\!], [\![D_i^{A2v}]\!], [\![C_i^{A(2v+1)}]\!], \text{ and } [\![D_i^{A(2v+1)}]\!])$$

corresponding to the segmentation policy A and sent by the apparatus A.

The apparatus B decrypts the encrypted intermediate parameter corresponding to the segmentation policy A based on the decryption key (sk) to obtain the intermediate parameter corresponding to the segmentation policy A. In other words, the apparatus B decrypts $$[\![C_i^{A2v}]\!], [\![D_i^{A2v}]\!], [\![C_i^{A(2v+1)}]\!], \text{ and } [\![D_i^{A(2v+1)}]\!]$$

based on the decryption key (sk) to obtain $$C_i^{A2v}, D_i^{A2v}, C_i^{A(2v+1)}, \text{ and } D_i^{A(2v+1)}.$$

It should be understood that, if homomorphic encryption is performed by using the public key synthesis technology, decryption is performed by multiple parties in a corresponding decryption process. In addition, in this case, the encrypted intermediate parameter corresponding to the segmentation policy B also needs to be decrypted. The apparatus B further decrypts the encrypted intermediate parameter corresponding to the segmentation policy B to obtain the intermediate parameter corresponding to the segmentation policy B. For a specific decryption method, refer to the description of step 606 in the embodiment shown in FIG. 6A-1 and FIG. 6A-2.

407: The apparatus B determines a gain corresponding to the segmentation policy A based on the intermediate parameter corresponding to the segmentation policy A.

For specific content, refer to the foregoing description of (3) in step 405. In (3) in step 405, i is replaced with j, and A is replaced with B. Details are not described herein again.

It should be understood that a sequence number and a description sequence of steps in this disclosure do not limit an execution sequence of the steps. For example, step 405 and steps 401 to 404 are not limited to an execution sequence. To be specific, step 405 may be performed before step 401, performed after step 404, or performed along with any one of steps 401 to 404. For another example, there is no limitation on an execution sequence of step 405 and steps 406 to 407. Details are not described again.

408: The apparatus B determines a preferred segmentation policy of the first node based on the gain corresponding to the segmentation policy A and the gain corresponding to the segmentation policy B.

Specifically, the apparatus B determines an optimal gain between the gain corresponding to the segmentation policy A and the gain corresponding to the segmentation policy B, and uses a segmentation policy corresponding to the optimal gain as the preferred segmentation policy of the first node. The preferred segmentation policy may also be referred to as an optimal segmentation policy. It should be understood that, because different gain calculation methods and/or different tree model algorithms are used, the preferred policy obtained for the first node may be different. Therefore, the optimal herein is a relative concept, and specifically refers to optimal in a specific gain calculation method and a specific tree model algorithm.

In an example, the apparatus B uses a segmentation policy with a minimum Gini coefficient as the preferred segmentation policy. It should be understood that when gains of two or more segmentation policies are the same, the apparatus B may select any one of the segmentation policies as the preferred segmentation policy, or may use a segmentation policy belonging to the segmentation policy B as the preferred segmentation policy. This is not limited in this disclosure.

Figure 5A:
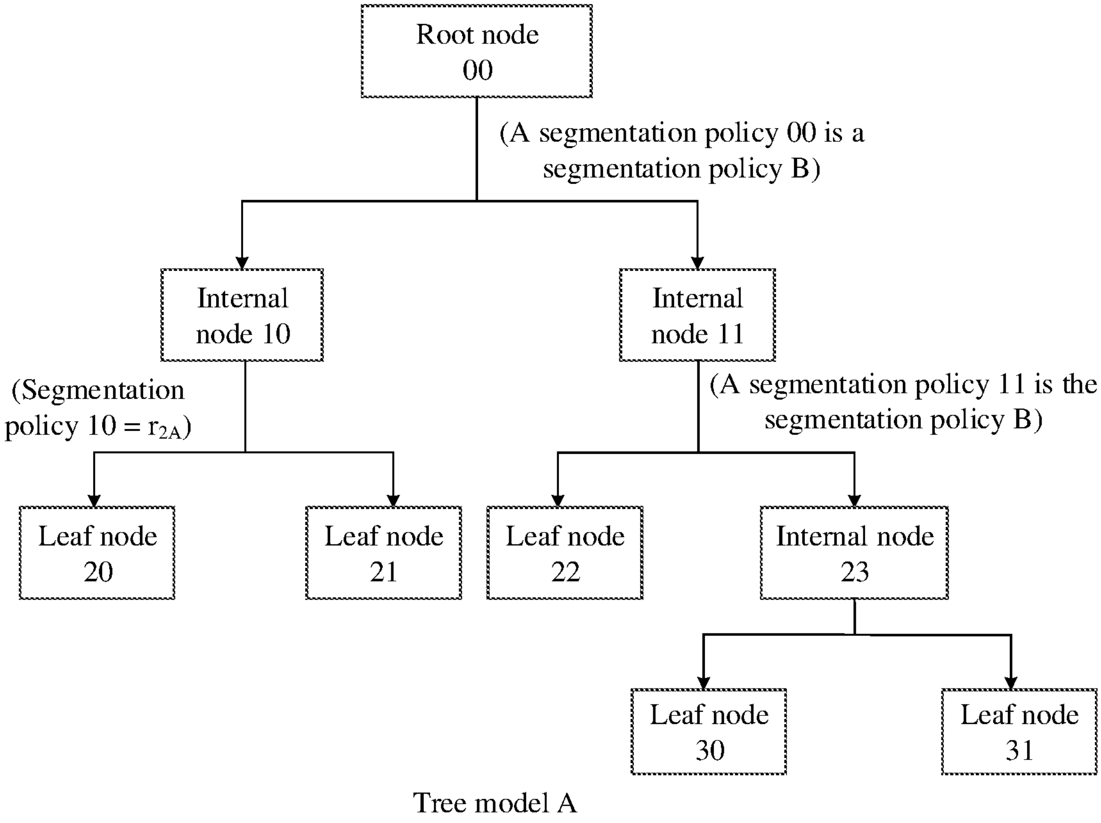
FIG. 5A and FIG. 5B each are a schematic diagram of a tree model according to an embodiment of this disclosure.
Figure 5B:
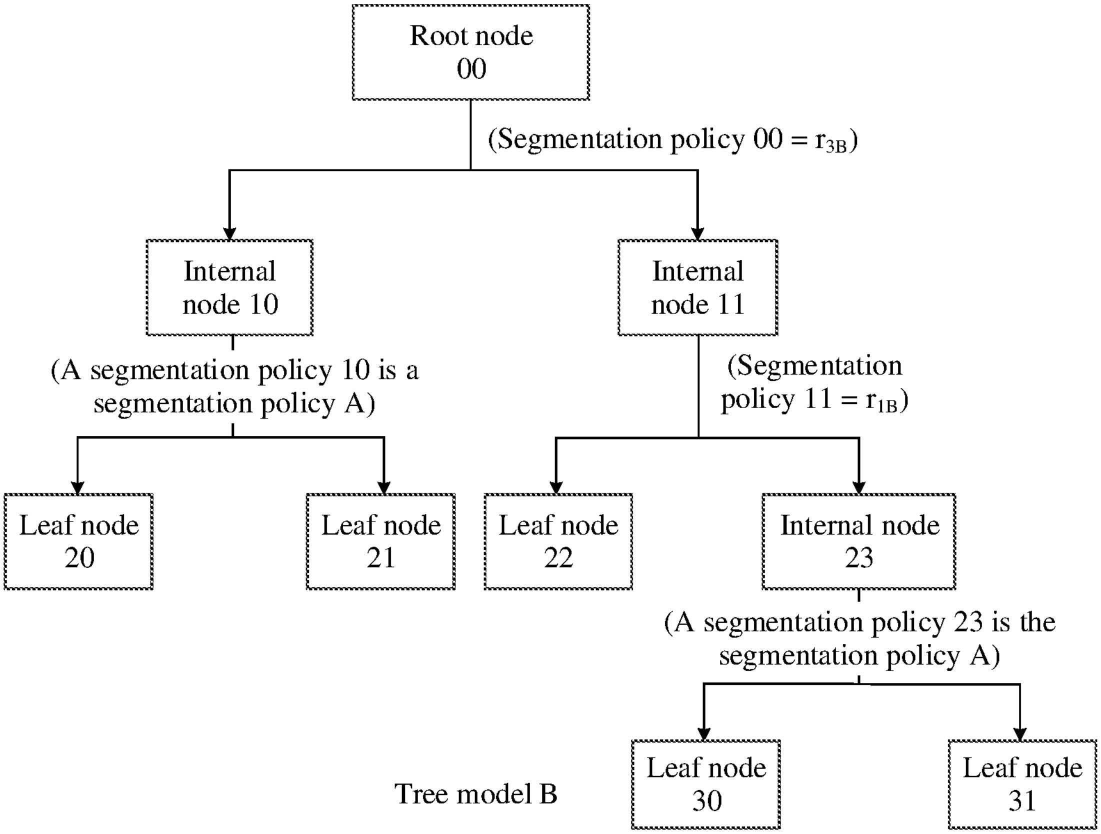

Therefore, the tree model is updated based on the preferred segmentation policy. The preferred segmentation policy is the segmentation policy A or the segmentation policy B. It should be understood that, in a vertical federated learning scenario, the apparatus A and the apparatus B perform joint training based on feature data of the apparatus A and the apparatus B. In a tree model obtained through training, a preferred policy of some nodes may be a segmentation policy of the apparatus A (including a feature in a feature $F_A$ of the apparatus A), and a preferred policy of the other nodes is a segmentation policy of the apparatus B (including a feature in a feature $F_B$ of the apparatus B). Therefore, a tree model A obtained by the apparatus A through training and a tree model B obtained by the apparatus B through training have a same structure, and separately store respective segmentation policies. Refer to examples in FIG. 5A and FIG. 5B. In a training process, the tree model A and the tree model B are jointly trained. In a subsequent prediction process, the tree model A and the tree model B are jointly used. Therefore, the tree model A and the tree model B may be considered as a same tree model (for example, a subtree model of the same tree model), or may be considered as two associated tree models. This is not limited in this disclosure.

The following describes specific steps of updating the tree model based on the preferred segmentation policy.

409: The apparatus B sends indication information about the preferred segmentation policy to the apparatus A.

The apparatus A receives the indication information, and updates the tree model A based on the indication information.

Specifically, the indication information indicates that the preferred segmentation policy is one of the segmentation policies A or one of the segmentation policies B. Therefore, the apparatus A determines, based on the indication information, whether the preferred segmentation policy is one of the segmentation policies A or one of the segmentation policies B. Further, the indication information further carries an identifier of the preferred segmentation policy, so that the apparatus A determines a specific preferred segmentation policy based on the identifier. For example, if the indication information carries an identifier i=2, the apparatus A determines that the segmentation policy $r_{2A}$ is the preferred segmentation policy of the first node.

To make the description clearer, the following is described in two cases (the two cases: the preferred segmentation policy is one of the segmentation policies A and the preferred segmentation policy is one of the segmentation policies B).

(1) If the preferred segmentation policy is one of the segmentation policies A.

410: The apparatus A applies the preferred segmentation policy to the first node of the tree model A.

Specifically, the apparatus A stores the preferred segmentation policy, and uses the preferred segmentation policy as a segmentation policy of the first node of the tree model A. For example, in FIG. 5A, the segmentation policy $r_{2A}$ is used as a segmentation policy of an internal node 10 of the tree model A. In this case, the apparatus B may also update the tree model B. For example, for the first node of the tree model B, the preferred segmentation policy is recorded on the apparatus A side.

411: The apparatus A determines encrypted second distribution information of the sample set for a first child node of the first node based on the encrypted first distribution information and a segmentation result of the preferred segmentation policy for the sample set.

The first child node refers to any child node (for example, the node 2v and the node 2v+1) of the first node.

The encrypted first distribution information may be sent by the apparatus B to the apparatus A in the foregoing steps (for example, step 401$b$, step 401$a'$, and step 409). After receiving the encrypted first distribution information, the apparatus A stores the encrypted first distribution information for subsequent use. The encrypted first distribution information is represented as $[\![S^v]\!]$. For specific content, refer to step 401$a$.

The segmentation result of the preferred segmentation policy for the sample set may be obtained in step 402. The apparatus A stores the segmentation result of the segmentation policy A obtained in step 402, so that when the preferred segmentation policy is one of the segmentation policies A, the stored segmentation result of the preferred segmentation policy for the sample set is directly read. Optionally, after completing reading, the apparatus A clears the stored segmentation result of the segmentation policy A, to release storage space. In addition, the apparatus A may further re-determine, in this step, the segmentation result of the preferred segmentation policy for the sample set. For a determining method, refer to step 402. Details are not described herein again. The segmentation result of the preferred segmentation policy for the sample set is represented as $W^{A2v}$ and $W^{A(2v+1)}$. For specific content, refer to step 402.

The encrypted second distribution information of the sample set for the node 2v and the node 2v+1 may be separately determined by using the following calculation methods:

$$[\![S^{2v}]\!] = [\![S^v]\!] \cdot W^{A2v}$$

$$[\![S^{2v+1}]\!] = [\![S^v]\!] \cdot W^{A(2v+1)}$$

In this case, $[\![S^{2v}]\!]$ is represented as $$[\![S^{2v}]\!] = [[\![s_1^{2v}]\!], \ldots , [\![s_p^{2v}]\!], \ldots , [\![s_P^{2v}]\!]].$$

$[\![S^{2v+1}]\!]$ is represented as $$[\![S^{2v+1}]\!] = [[\![s_1^{2v+1}]\!], \ldots , [\![s_p^{2v+1}]\!], \ldots , [\![s_P^{2v+1}]\!]].$$

It should be understood that the foregoing calculation may alternatively be performed when the segmentation result of the segmentation policy A is in a ciphertext state. In other words, the segmentation result of the segmentation policy A in the foregoing calculation equation is specifically an encrypted segmentation result of the segmentation policy A. In this case, the apparatus A also needs the encryption key (pk), and the apparatus B further sends the encryption key (pk) to the apparatus A, so that the apparatus A further encrypts the segmentation result of the segmentation policy A based on the encryption key (pk) in step 402 to obtain the encrypted segmentation result. In this disclosure, when the second distribution information is calculated based on the segmentation result, the calculation is similar. The calculation may be performed based on the segmentation result in plaintext, or the calculation may be performed based on the segmentation result in ciphertext. For brevity of description, details are not described herein again. Similarly, when the intermediate parameter is calculated based on the segmentation result, the calculation may be performed based on the segmentation result in plaintext, or the calculation may be performed based on the segmentation result in ciphertext. A person skilled in the art should understand that the segmentation result of the segmentation policy A in this disclosure may be specifically plaintext or ciphertext.

412: The apparatus A sends the encrypted second distribution information to the apparatus B.

The apparatus B receives the encrypted second distribution information.

413: The apparatus B decrypts the encrypted second distribution information to obtain the second distribution information of the sample set for the first child node.

Specifically, the apparatus B decrypts the encrypted second distribution information based on the decryption key (sk) to obtain the second distribution information. The second distribution information includes indication data indicating whether each sample in the sample set belongs to the first child node.

The second distribution information of the node 2v and the second distribution information of the node 2v+1 are respectively represented as $$S^{2v}=\left[s_1^{2v},\ \ldots\ ,s_p^{2v},\ \ldots\ ,s_P^{2v}\right]$$

and $$S^{2v+1}=\left[s_1^{2v+1},\ \ldots\ ,s_p^{2v+1},\ \ldots\ ,s_P^{2v+1}\right].$$

For the node 2v, if $$s_p^{2v}$$

is a non-zero character (for example, 1), $$s_p^{2v}$$

indicates that the $p^{th}$ sample belongs to the node 2v; or if $$s_p^{2v}$$

is a 0 character, $$s_p^{2v}$$

indicates that the $p^{th}$ sample does not belong to the node 2v. For the node 2v+1, if $$s_p^{2v+1}$$

is a non-zero character (for example, 1), $$s_p^{2v+1}$$

indicates that the $p^{th}$ sample belongs to the node 2v+1; or if $$s_p^{2v+1}$$

is a 0 character, $$s_p^{2v+1}$$

indicates that the $p^{th}$ sample does not belong to the node 2v+1.

The second distribution information is used to determine encrypted label distribution information of the first child node. For a specific method, refer to the description of step 401 above. The first node is replaced with the first child node. The second distribution information may be further used to determine a second sample subset of the first child node, and each sample in the second sample set belongs to the first child node.

The apparatus A and the apparatus B continue to train the first child node, to determine a preferred policy of the first child node. A method for training the first child node is not described herein again. Refer to the method for training the first node.

It should be understood that, if the homomorphic encryption is performed by using the public key synthesis technology, step 413 is not performed. In other words, the apparatus B does not decrypt the encrypted second distribution information. The encrypted second distribution information is used to determine the encrypted label distribution information of the first child node. For details, refer to the description of step 613 in the embodiment shown in FIG. 6B-1 and FIG. 6B-2.

(2) If the preferred segmentation policy is one of the segmentation policies B.

414: The apparatus B applies the preferred segmentation policy to the first node of the tree model B.

Specifically, the apparatus B stores the preferred segmentation policy, and uses the preferred segmentation policy as a segmentation policy of the first node of the tree model B. In this case, the apparatus A may also update the tree model A. For example, for the first node of the tree model A, the preferred segmentation policy is recorded on the apparatus B side.

415: The apparatus B determines the second distribution information of the sample set for the first child node based on the segmentation result of the preferred segmentation policy and the first distribution information.

For the first distribution information, refer to the foregoing description (for example, step 401*a*). The first distribution information is represented as $$S^v = [s_1^v, \ldots , s_p^v, \ldots , s_P^v].$$

The segmentation result of the preferred segmentation policy may be specifically a segmentation result of the preferred segmentation policy for each sample in the sample set, and is represented as:

$$W^{B2v} = [w_1^{B2v}, \ldots , w_p^{B2v}, \ldots , w_P^{B2v}]$$

$$W^{B(2v+1)} = [w_1^{B(2v+1)}, \ldots , w_p^{B(2v+1)}, \ldots , w_P^{B(2v+1)}]$$

The segmentation result of the preferred segmentation policy may be specifically a segmentation result of the preferred segmentation policy for each sample in the first sample subset of the first node, and is represented as:

$$W^{B2v} = [w_1^{B2v}, \ldots , w_q^{B2v}, \ldots , w_Q^{B2v}]$$

$$W^{B(2v+1)} = [w_1^{B(2v+1)}, \ldots , w_2^{B(2v+1)}, \ldots , w_Q^{B(2v+1)}]$$

For details about the segmentation result of the preferred segmentation policy, refer to the description of step 405.

Optionally, the apparatus B stores the segmentation result of the segmentation policy B obtained in step 405, so that when the preferred segmentation policy is one of the segmentation policies B, the stored segmentation result of the preferred segmentation policy for the sample set is directly read. Optionally, after completing reading, the apparatus B clears the stored segmentation result of the segmentation policy B, to release storage space. In addition, the apparatus B may further re-determine, in this step, the segmentation result of the preferred segmentation policy. For a determining method, refer to step 405. Details are not described herein again.

The second distribution information of the sample set for the node 2v and the node 2v+1 may be separately determined by using the following calculation methods:

$$S^{2v} = S^v \cdot W^{B2v}$$

$$S^{2v+1} = S^v \cdot W^{B(2v+1)}$$

When the segmentation result of the preferred segmentation policy is a segmentation result of the preferred segmentation policy for each sample in the sample set, multiplication is directly performed by element according to the foregoing equations.

When the segmentation result of the preferred segmentation policy is a segmentation result of the preferred segmentation policy for each sample in the first sample subset, data of Q samples in the first sample subset in $S^v$ may be extracted for calculation, and $S^{2v}$ is used as an example for description.

$$S^{2v} = [s_1^v \cdot w_1^{B2v}, \ldots , s_q^v \cdot w_q^{B2v}, \ldots , s_Q^v \cdot w_Q^{B2v}]$$

$$S^{2v} = [s_1^v \cdot w_1^{B2v}, \ldots , s_q^v \cdot w_q^{B2v}, \ldots , s_Q^v \cdot w_Q^{B2v}]$$

In this case, for another sample that does not belong to the first sample subset in the sample set, the indication data in the second distribution information is directly set to 0, because a sample that does not belong to the first sample subset (namely, a sample that does not belong to the first node) cannot belong to the first child node of the first node.

For an explanation of the second distribution information, refer to the description of step 413. Details are not described herein again.

It should be understood that step 409 may be performed after step 415. The indication information may further carry the second distribution information.

This embodiment of this disclosure describes a training process of the first node as an example. It should be understood that a training process of another node (for example, an upper-layer node and/or a lower-layer node of the first node) is similar. In other words, steps 401 to 414 are performed for a plurality of times until the child node reaches a preset standard and the training is completed. In an optional manner, step 400 may also be performed for a plurality of times. In other words, the apparatus B may generate multiple pairs of encryption keys and decryption keys for homomorphic encryption, to periodically change keys. This further improves security. In addition, when training of one tree is completed, another tree may be further trained, and a training method is also similar.

In this embodiment of this disclosure, the encrypted intermediate parameter corresponding to the segmentation policy A of the apparatus A is determined based on the encrypted label distribution information of the first node, and the encrypted intermediate parameter is used to calculate the gain corresponding to the segmentation policy A. Therefore, the apparatus A does not need to obtain a distribution status of the sample set for the first node, and the gain of the segmentation policy A can also be calculated. Therefore, the apparatus B can determine the preferred segmentation policy based on the gain of the segmentation policy B and the gain of the segmentation policy A. In other words, the apparatus A does not obtain a distribution status of sample sets on each node in the tree model. Therefore, the vertical federated learning method provided in this disclosure is more secure.

In an example, for multiple classification (which generally means two sample classification results) case (for details, refer to the descriptions after the embodiment shown in FIG. 3B and before the embodiments shown in FIG. 4A and FIG. 4B), a tree model training method is also similar. In an optional manner, the tree model for multiple classification may also be segmented into a plurality of tree models for binary classification for training. For a training method of each tree model, refer to the foregoing description. Details are not described again.

In another optional manner, if the tree model for multiple classification is directly trained, a training method is similar. For specific steps, refer to the foregoing descriptions. However, representations and calculation equations of some parameters in the foregoing description need to be adaptively modified. The following describes the representations and calculation equations of the parameters that need to be modified.

Any row in the label set Y for multiple classification may be represented as Y $$Y^c = [y_1^c, y_2^c, \ldots, y_p^c, \ldots, y_P^C].$$

It should be understood that the following uses an example in which the first label information is represented as the label set Y for description. For another algorithm such as the XGBoost algorithm, this is also similar. Details are not described again. In this case, the first label distribution information may be represented as $Y^{v\_c}=Y^c$.

$$S^v = [y_1^{v\_c}, y_2^{v\_c}, \ldots, y_p^{v\_c}, \ldots, y_P^{v\_c}].$$

The encrypted first label distribution information may be represented as $$[\![Y^{v}\_c]\!] = [[\![y_1^{v\_c}]\!], [\![y_2^{v\_c}]\!], \ldots, [\![y_p^{v\_c}]\!], \ldots, [\![y_P^{v\_c}]\!]].$$

Therefore, a method for calculating an encrypted intermediate parameter corresponding to a segmentation policy $r_{iA}$ is as follows:

$$[\![C_i^{A2v\_c}]\!] = \sum_{p=1}^{P} [\![y_p^{v\_c}]\!] w_p^{A2v}$$

$$[\![D_i^{A2v}]\!] = \sum_{p=1}^{P} [\![s_p^{v}]\!] w_p^{A2v}$$

$$[\![C_i^{A(2v+1)\_c}]\!] = \sum_{p=1}^{P} [\![y_p^{v\_c}]\!] w_p^{A(2v+1)}$$

$$[\![D_i^{A(2v+1)}]\!] = \sum_{p=1}^{P} [\![s_p^{v}]\!] w_p^{A(2v+1)}$$

Intermediate parameters $$C_i^{A2v\_c}, D_i^{A2v}, C_i^{A(2v+1)\_c}, \text{ and } D_i^{A(2v+1)}$$

corresponding to the segmentation policy $r_{iA}$ are obtained by the apparatus B by decrypting $$[\![C_i^{A2v\_c}]\!], [\![D_i^{A2v}]\!], [\![C_i^{A(2v+1)\_c}]\!], \text{ and } [\![D_i^{A(2v+1)}]\!].$$

In this case, the gain corresponding to the segmentation policy $r_{iA}$ is as follows:

$$Gini = \frac{D_i^{A2v}}{D_i^{A2v} + D_i^{A(2v+1)}}\left(1 - \sum_{c=1}^{C}\left(\frac{C_i^{A2v\_c}}{D_i^{A2v}}\right)^2\right) + \frac{D_i^{A(2v+1)}}{D_i^{A2v} + D_i^{A(2v+1)}}\left(1 - \sum_{c=1}^{C}\left(\frac{C_i^{A(2v+1)\_c}}{D_i^{A(2v+1)}}\right)^2\right)$$

The equation for calculating the gain corresponding to the segmentation policy $r_{jB}$ is similar. In the foregoing gain calculation equation, A is replaced with B, and i is replaced with j.

In an example, data of every L samples in the P samples of the sample set is used as one data block, to divide each data set into blocks. It should be understood that block division may also be referred to as grouping, packaging, or the like. Correspondingly, data of every L samples is used as a data group, a data packet, or the like. If P cannot be exactly divided by L, data included in the last data block is less than data of L samples. For ease of calculation, data of L samples needs to be supplemented for the last data block, and a zero padding operation is performed for the insufficient data. The data block may also be used for the foregoing calculation and transmission. In other words, the foregoing various types of data may be specifically calculated and/or transmitted in a form of a data block.

It should be understood that the following specifically describes steps related to block division. For steps not related to block division, directly refer to the foregoing descriptions. Details are not described again. In addition, the following uses an example in which the first label information is represented as the label set Y for description. For another algorithm such as the XGBoost algorithm, this is also similar. Details are not described again.

In 401*a*, the apparatus B further divides the first label information Y into blocks, and the first label information of the blocks is represented as $EY=[EY_1, EY_2, \ldots, EY_z, \ldots, EY_Z]$. Z is a quantity of blocks. $Z=\lceil P/L \rceil$. In other words, Z is equal to rounding up P/L. A value of L (A size of a data block) may be set based on a requirement. This is not limited in this embodiment of this disclosure. z is any positive integer less than or equal to Z. Specifically, $EY_1=[y_1, y_2, \ldots, y_L]$, $EY_2=[Y_{L+1}, Y_{L+2}, \ldots, y_{2L}], \ldots$, and $EY_z=[y_{(z-1)L+1}, y_{(z-1)L+2}, \ldots, y_{zL}]$. For the last data block, if the included data is data of less than L samples, a zero padding operation is performed on the insufficient data, that is, $EY_Z=[y_{(Z-1)L+1}, y_{(Z-1)L+2}, \ldots, y_P, 0, \ldots, 0]$. For other data blocks, a zero padding operation is similar. Details are not described below again.

Similarly, the apparatus B divides the first distribution information $S^v$ of the first node into blocks, and the first distribution information of the blocks is represented as $$ES^v = [ES_1^v, \ldots, ES_z^v, \ldots, ES_Z^v].$$

Further, the apparatus B determines the first label distribution information of the blocks based on first distribution information of the blocks and first label information of the blocks. The first label distribution information of the blocks is represented as $$EY^v = EY \cdot ES^v = [EY_1^v, \ldots, EY_z^v, \ldots, EY_Z^v].$$

It should be understood that the apparatus B may alternatively first determine the first label distribution information based on the first distribution information and the first label information, and then divide the first label distribution information into blocks, to obtain the first label distribution information of the blocks. This is not limited in this disclosure.

Further, the apparatus B separately encrypts the first distribution information of the blocks and the first label distribution information of the blocks to obtain encrypted first label distribution information of the blocks and encrypted first distribution information of the blocks. The encrypted first label distribution information of the blocks is represented as $$[\![EY^v]\!] = [[\![EY_1^v]\!], \ldots, [\![EY_z^v]\!], \ldots, [\![EY_Z^v]\!]],$$

and the encrypted first distribution information of the blocks is represented as $$[\![ES^v]\!] = [[\![ES_1^v]\!], \ldots, [\![ES_z^v]\!], \ldots, [ES_Z^v]\!]].$$

A data set (such as the first label distribution information and the first distribution information) is divided into blocks and then encrypted, so that processing efficiency can be improved, and computing resources can be saved.

In 401*b*, the apparatus B sends the encrypted first label distribution information of the blocks and the encrypted first distribution information of the blocks to the apparatus A.

In 401*a*', the apparatus B sends the encrypted first label information of the blocks and the encrypted first distribution information of the blocks to the apparatus A.

In 401*b*', the apparatus A determines the encrypted first label distribution information of the blocks based on the encrypted first label information of the blocks and the encrypted first distribution information of the blocks, which is specifically as follows: $[\![EY^v]\!]=[\![EY]\!]\cdot[\![ES^v]\!]$.

In 402, the apparatus A further performs block division on the segmentation result of the segmentation policy A to obtain a segmentation result of the blocks of the segmentation policy A. A segmentation policy $r_{iA}$ is used as an example. A segmentation result of the blocks of the segmentation policy $r_{iA}$ is represented as follows:

$$EW^{A2v} = \left[EW_1^{A2v}, \ldots, EW_z^{A2v}, \ldots, EW_Z^{A2v}\right]$$

$$EW^{A(2v+1)} = \left[EW_1^{A(2v+1)}, \ldots, EW_z^{A(2v+1)}, \ldots, EW_Z^{A(2v+1)}\right]$$

In 403, the apparatus A determines an encrypted intermediate parameter corresponding to the segmentation policy A of the blocks based on the segmentation result of the segmentation policy A of the blocks and the encrypted first label distribution information of the blocks. The segmentation policy $r_{iA}$ is used as an example. A method for calculating an encrypted intermediate parameter corresponding to a segmentation policy $r_{iA}$ of the blocks is as follows:

$$[\![EC_i^{A2v}]\!] = \sum_{z=1}^{Z} [\![EY_z^v]\!] EW_z^{A2v}$$

$$[\![ED_i^{A2v}]\!] = \sum_{z=1}^{Z} [\![ES_z^v]\!] EW_z^{A2v}$$

$$[\![EC_i^{A(2v+1)}]\!] = \sum_{z=1}^{Z} [\![EY_z^v]\!] EW_z^{A(2v+1)}$$

-continued $$[\![ED_i^{A(2v+1)}]\!] = \sum_{z=1}^{Z} [\![ES_z^v]\!] EW_Z^{A(2v+1)}$$

In 404, the apparatus A sends the encrypted intermediate parameter corresponding to the segmentation policy A of the blocks to the apparatus B.

In 405, in a process of determining the gain corresponding to the segmentation policy of the apparatus B, the apparatus B may not perform block division processing, because the apparatus B, as a labeled party, may obtain, in a plaintext state, the gain corresponding to the segmentation policy of the apparatus B, and does not need to encrypt data generated in a process or data generated in a transmission process. It should be understood that the apparatus B may also perform block division processing. This is not limited in this disclosure.

In 406, the apparatus B decrypts the encrypted intermediate parameter corresponding to the segmentation policy A of the blocks to obtain an encrypted intermediate parameter corresponding to the segmentation policy A of the blocks.

A segmentation policy $r_{iA}$ is used as an example. An intermediate parameter corresponding to the segmentation policy $r_{iA}$ of the blocks is represented as follows:

$$EC_i^{A2v} = \left[c_1^{A2v}, c_2^{A2v}, \ldots, c_l^{A2v}, \ldots, c_L^{A2v}\right]$$

$$ED_i^{A2v} = \left[d_1^{A2v}, d_2^{A2v}, \ldots, d_l^{A2v}, \ldots, d_L^{A2v}\right]$$

$$EC_i^{A(2v+1)} = \left[c_1^{A(2v+1)}, c_2^{A(2v+1)}, \ldots, c_l^{A(2v+1)}, \ldots, c_L^{A(2v+1)}\right]$$

$$ED_i^{A(2v+1)} = \left[d_1^{A(2v+1)}, d_2^{A(2v+1)}, \ldots, d_l^{A(2v+1)}, \ldots, d_L^{A(2v+1)}\right]$$

In 407, the apparatus B determines a gain corresponding to the segmentation policy A based on the intermediate parameter corresponding to the segmentation policy A of the blocks.

Specifically, the apparatus B determines the intermediate parameter corresponding to the segmentation policy A based on the intermediate parameter corresponding to the segmentation policy A of the blocks. The calculation method is as follows:

$$C_i^{A2v} = \sum_{l=1}^{L} c_l^{A2v}$$

$$D_i^{A2v} = \sum_{l=1}^{L} d_l^{A2v}$$

$$C_i^{A(2v+1)} = \sum_{l=1}^{L} c_l^{A(2v+1)}$$

$$D_i^{A(2v+1)} = \sum_{l=1}^{L} d_l^{A(2v+1)}$$

Then, the apparatus B determines the gain corresponding to the segmentation policy A based on the intermediate parameter corresponding to the segmentation policy A.

In 411, the apparatus A determines encrypted second distribution information of the sample set for the first child node of the blocks based on the encrypted first distribution information of the blocks and the segmentation result of the preferred segmentation policy of the blocks. The calculation method is as follows:

$$[\![ES^{A2v}]\!] = [\![ES^{v}]\!] \cdot EW^{A2v}$$

$$[\![ES^{A(2v+1)}]\!] = [\![ES^{v}]\!] \cdot EW^{A(2v+1)}$$

In 412, the apparatus A sends the encrypted second distribution information of the blocks to the apparatus B.

In 413, the apparatus B decrypts the encrypted second distribution information of the blocks to obtain the second distribution information of the blocks. The foregoing block division method can improve encryption and decryption efficiency, and reduce consumption of computing resources.

To make the method for training a tree model by using the public key synthesis technology in a vertical federated learning scenario provided in this embodiment of this disclosure clearer, the following specifically describes the method by using the embodiments shown in FIG. 6A-1 and FIG. 6A-2 and FIG. 6B-1 and FIG. 6B-2. The method may also be applicable to application scenarios such as FIG. 2, FIG. 3A, and FIG. 3B. Specific steps are as follows:

600$a$: The apparatus A generates the encryption key ($pk_A$) for homomorphic encryption and the decryption key ($sk_A$) for homomorphic encryption of the apparatus A.

When there are a plurality of apparatuses A, the plurality of apparatuses A generate respective encryption keys and decryption keys. This is not limited in this disclosure. One apparatus A is used as an example for description.

600$b$: The apparatus B generates the encryption key ($pk_B$) for homomorphic encryption and the decryption key ($sk_B$) for homomorphic encryption of the apparatus B.

600$c$: The apparatus A sends the encryption key ($pk_A$) of the apparatus A to the apparatus B.

600$d$: The apparatus B generates a synthetic encryption key ($pk_{AB}$) for homomorphic encryption based on the encryption key ($pk_A$) of the apparatus A and the encryption key ($pk_B$) of the apparatus B.

The apparatus B may further send the encryption key ($pk_{AB}$) to the apparatus A.

For ease of distinguishing, the encryption key ($pk_A$) and the decryption key ($sk_A$) may be respectively referred to as a first encryption key and a first decryption key. The encryption key ($pk_B$) and the decryption key ($sk_B$) are respectively referred to as a second encryption key and a second decryption key. The encryption key ($pk_{AB}$) is referred to as a third encryption key. It should be understood that the third encryption key ($pk_{AB}$) may also be referred to as a synthetic public key, a synthetic encryption key, or the like.

It should be understood that in this disclosure, the third encryption key may be generated in another manner. For example, in 600$c$, the apparatus B sends the encryption key ($pk_B$) to the apparatus A, and in Good, the apparatus A generates the encryption key ($pk_{AB}$) based on the encryption key ($pk_A$) and the encryption key ($pk_B$), and sends the encryption key ($pk_{AB}$) to the apparatus B. For another example, the apparatus A and the apparatus B respectively synthesize the encryption key ($pk_{AB}$). Details are not described again.

601$a$: The apparatus B determines first label distribution information of a sample set for a first node based on first label information of the sample set and first distribution information of the sample set for the first node.

When the first node is a root node, the apparatus B may perform calculation in a plaintext or ciphertext state to obtain the first label distribution information of the first node. For details, refer to the description of step 401$a$ in the embodiment shown in FIG. 4A. Therefore, the apparatus B encrypts the first label distribution information based on the synthetic encryption key ($pk_{AB}$) to obtain encrypted first label distribution information of the sample set for the first node.

When the first node is not a root node, the apparatus B performs calculation in a ciphertext state. Specifically, the apparatus B determines the encrypted first label distribution information based on the encrypted first label information and the encrypted first distribution information. The calculation method is as follows:

$$[\![Y^{v}]\!] = [\![Y]\!] \cdot [\![S^{v}]\!] = \left[[\![y_1^{v}]\!], [\![y_2^{v}]\!], \ldots, [\![y_p^{v}]\!], \ldots, [\![y_P^{v}]\!]\right]$$

It should be understood that the encryption herein refers to homomorphic encryption performed by using the public key synthesis technology. Therefore, decryption cannot be performed based on only the decryption key ($sk_B$) of the apparatus B. Therefore, the apparatus B cannot obtain distribution information of a sample set in plaintext in a training process, and cannot infer a segmentation result of the apparatus A. This further improves security. In addition, in this embodiment of this disclosure, an example in which the first label information is represented as the label set Y is used for description. For another algorithm such as the XGBoost algorithm, this is also similar. Details are not described again.

601$b$: The apparatus B sends the encrypted first label distribution information to the apparatus A.

For details, refer to the description of step 401$b$ in the embodiment shown in FIG. 4A. Details are not described herein again.

In another possible implementation (namely, steps 601$a'$ to 601$c'$), the apparatus B further sends the encrypted first label information and the encrypted first distribution information to the apparatus A. Therefore, the apparatus B and the apparatus A separately determine the encrypted first label distribution information based on the encrypted first label information and the encrypted first distribution information. Details are not described again.

For steps 602 to 604, refer to the descriptions of steps 402 to 404 in the embodiment shown in FIG. 4A. Details are not described herein again.

605$a$: The apparatus B determines a segmentation result of a segmentation policy of the apparatus B.

The apparatus B obtains a segmentation policy (a segmentation policy B) of the apparatus B, which may be represented as $R_B=\{r_{1B}, r_{2B}, \ldots, r_{jB}, \ldots, r_{JB}\}$. Further, the apparatus B determines a segmentation result of the segmentation policy B for each sample in the sample set. The segmentation result is represented as follows:

$$W^{B2v} = \left[w_1^{B2v}, \ldots, w_p^{B2v}, \ldots, w_P^{B2v}\right]$$

$$W^{B(2v+1)} = \left[w_1^{B(2v+1)}, \ldots, w_p^{B(2v+1)}, \ldots, w_P^{B(2v+1)}\right]$$

605$b$: The apparatus B determines an encrypted intermediate parameter corresponding to the segmentation policy B based on the segmentation result of the segmentation policy B and the encrypted first label distribution information.

Specifically, for each of the segmentation policies B, the apparatus B calculates a corresponding encrypted intermediate parameter. For a calculation method, refer to the description of step 403 in the embodiment shown in FIG.

4A. For example, in step 403, A is replaced with B, and i is replaced with j. Details are not described herein again.

606: The apparatus B obtains the intermediate parameter corresponding to the segmentation policy B and the intermediate parameter corresponding to the segmentation policy A based on the encrypted intermediate parameter corresponding to the segmentation policy B and the encrypted intermediate parameter corresponding to the segmentation policy A.

Specifically, the apparatus B decrypts the encrypted intermediate parameter corresponding to the segmentation policy B and the encrypted intermediate parameter corresponding to the segmentation policy A to obtain the intermediate parameter corresponding to the segmentation policy B and the intermediate parameter corresponding to the segmentation policy A.

There are a plurality of decryption methods corresponding to the public key synthesis technology. For example, multiple participating parties perform decryption separately, and then combine decryption results of the multiple parties to obtain a plaintext. For another example, multiple participating parties perform decryption in sequence to obtain a plaintext. The following describes a decryption method as an example.

1. Separate Decryption Method

The apparatus A and the apparatus B respectively decrypt the encrypted intermediate parameter corresponding to the segmentation policy A based on the respective decryption keys, and the apparatus B synthesizes the foregoing decryption results to obtain the intermediate parameter corresponding to the segmentation policy A. A method for decrypting the encrypted intermediate parameter corresponding to the segmentation policy B is similar. Details are as follows:

(1) The apparatus B sends the encrypted intermediate parameter corresponding to the segmentation policy B and the encrypted intermediate parameter corresponding to the segmentation policy A to the apparatus A.

(2) The apparatus A respectively decrypts the encrypted intermediate parameter corresponding to the segmentation policy B and the encrypted intermediate parameter corresponding to the segmentation policy A based on the decryption key ($sk_A$) to obtain the encrypted intermediate parameter corresponding to the segmentation policy B and decrypted by the apparatus A and the encrypted intermediate parameter corresponding to the segmentation policy A and decrypted by the apparatus A.

(3) The apparatus A sends, to the apparatus B, the encrypted intermediate parameter corresponding to the segmentation policy B and decrypted by the apparatus A and the encrypted intermediate parameter corresponding to the segmentation policy A and decrypted by the apparatus A.

(4) The apparatus B respectively decrypts the encrypted intermediate parameter corresponding to the segmentation policy B and the encrypted intermediate parameter corresponding to the segmentation policy A based on the decryption key ($sk_B$) to obtain the encrypted intermediate parameter corresponding to the segmentation policy B and decrypted by the apparatus B and the encrypted intermediate parameter corresponding to the segmentation policy A and decrypted by the apparatus B.

(5) The apparatus B determines the intermediate parameter corresponding to the segmentation policy B based on the encrypted intermediate parameter corresponding to the segmentation policy B and decrypted by the apparatus A and the encrypted intermediate parameter corresponding to the segmentation policy B and decrypted by the apparatus B. Similarly, the apparatus B determines the intermediate parameter corresponding to the segmentation policy A based on the encrypted intermediate parameter corresponding to the segmentation policy A and decrypted by the apparatus A and the encrypted intermediate parameter corresponding to the segmentation policy A and decrypted by the apparatus B.

It should be understood that, before step 604, the apparatus A may perform decryption to obtain the encrypted intermediate parameter corresponding to the segmentation policy A and decrypted by the apparatus A. Optionally, in step 604, the apparatus A may further send, to the apparatus B, the encrypted intermediate parameter corresponding to the segmentation policy A and decrypted by the apparatus A.

2. Sequential Decryption Method

The apparatus A decrypts the encrypted intermediate parameter corresponding to the segmentation policy A based on the decryption key ($sk_A$), and then sends a decryption result of the apparatus A to the apparatus B. After receiving the decryption result of the apparatus A, the apparatus B continues to decrypt the decryption result of the apparatus A based on the decryption key ($sk_B$) to obtain the intermediate parameter corresponding to the segmentation policy A. A method for decrypting the encrypted intermediate parameter corresponding to the segmentation policy B is similar. Details are as follows:

(1) to (3) are the same as (1) to (3) in the foregoing separate decryption method. Details are not described herein again.

(4) The apparatus B respectively decrypts, based on the decryption key ($sk_B$), the encrypted intermediate parameter corresponding to the segmentation policy B and decrypted by the apparatus A and the encrypted intermediate parameter corresponding to the segmentation policy A and decrypted by the apparatus A to obtain the intermediate parameter corresponding to the segmentation policy B and the intermediate parameter corresponding to the segmentation policy A.

It should be understood that, before step 604, the apparatus A may perform decryption to obtain the encrypted intermediate parameter corresponding to the segmentation policy A and decrypted by the apparatus A. Optionally, in step 604, the apparatus A directly sends, to the apparatus B, the encrypted intermediate parameter corresponding to the segmentation policy A and decrypted by the apparatus A, and does not send the encrypted intermediate parameter corresponding to the segmentation policy A.

607: The apparatus B respectively determines the gain corresponding to the segmentation policy B and the gain corresponding to the segmentation policy A based on the intermediate parameter corresponding to the segmentation policy B and the intermediate parameter corresponding to the segmentation policy A.

For specific content, refer to the descriptions of (3) in step 405 and step 407 in the embodiment shown in FIG. 4A. Details are not described herein again.

608: The apparatus B determines a preferred segmentation policy of the first node based on the gain corresponding to the segmentation policy B and the gain corresponding to the segmentation policy A.

For specific content, refer to the description of step 408 in the embodiment shown in FIG. 4A. Details are not described herein again.

606 to 608 are a manner in which the apparatus B determines the preferred segmentation policy. It should be understood that there may be another manner, for example, 606*a*' to 606*d*', 607*a*' and 607*b*', and 608 below. In this manner, the apparatus A obtains the intermediate parameter and the gain corresponding to the segmentation policy A (in plaintext), and determines a second segmentation policy A with an optimal gain based on the gain corresponding to the segmentation policy A, to send the gain of the second segmentation policy A to the apparatus B. In this way, the apparatus B does not obtain the intermediate parameter and the gain corresponding to the segmentation policy A in plaintext. This further improves security. The method is specifically as follows:

606*a*': The apparatus A obtains the intermediate parameter corresponding to the segmentation policy A based on the encrypted intermediate parameter corresponding to the segmentation policy A.

Similar to step 606, there are a plurality of decryption methods, and the following provides an example for description.

1. Separate Decryption Method

The apparatus A and the apparatus B respectively decrypt the encrypted intermediate parameter corresponding to the segmentation policy A based on the respective decryption keys, and the apparatus A synthesizes the foregoing decryption results to obtain the intermediate parameter corresponding to the segmentation policy A. Specific content is similar to that of the separate decryption method in step 606, and the difference lies in that the apparatus A performs synthesis herein.

(1) The apparatus B decrypts the encrypted intermediate parameter corresponding to the segmentation policy A based on the decryption key ($sk_B$) to obtain the encrypted intermediate parameter corresponding to the segmentation policy A and decrypted by the apparatus B.

(2) The apparatus B sends, to the apparatus A, the encrypted intermediate parameter corresponding to the segmentation policy A and decrypted by the apparatus B.

(3) The apparatus A decrypts the encrypted intermediate parameter corresponding to the segmentation policy A based on the decryption key ($sk_A$) to obtain the encrypted intermediate parameter corresponding to the segmentation policy A and decrypted by the apparatus A.

(4) The apparatus A determines the intermediate parameter corresponding to the segmentation policy A based on the encrypted intermediate parameter corresponding to the segmentation policy A and decrypted by the apparatus A and the encrypted intermediate parameter corresponding to the segmentation policy A and decrypted by the apparatus B.

2. Sequential Decryption Method

The apparatus B decrypts the encrypted intermediate parameter corresponding to the segmentation policy A based on the decryption key ($sk_B$), and then sends a decryption result of the apparatus B to the apparatus A. After receiving the decryption result of the apparatus B, the apparatus A continues to decrypt the decryption result of the apparatus B based on the decryption key ($sk_A$) to obtain the intermediate parameter corresponding to the segmentation policy A. Specific content is similar to that of the sequential decryption method in step 606, and the difference lies in that the apparatus B performs decryption first, and then the apparatus A performs decryption.

(1) to (2) are the same as (1) to (2) in the foregoing separate decryption method. Details are not described herein again.

(3) The apparatus A decrypts, based on the decryption key ($sk_A$), the encrypted intermediate parameter corresponding to the segmentation policy A and decrypted by the apparatus B to obtain the intermediate parameter corresponding to the segmentation policy A.

606*b*': The apparatus A determines the gain corresponding to the segmentation policy A based on the intermediate parameter corresponding to the segmentation policy A.

For specific content, refer to step 407, (3) in step 405, and the like in the embodiment shown in FIG. 4A. Details are not described herein again.

606*c*': The apparatus A determines the second segmentation policy A based on the gain corresponding to the segmentation policy A.

Specifically, the apparatus A determines the optimal gain in the gain corresponding to the segmentation policy A. The segmentation policy corresponding to the optimal gain is referred to as the second segmentation policy A. For ease of description, the segmentation policy A may be referred to as the first segmentation policy A. It should be understood that, in this case, the first segmentation policy A includes the second segmentation policy A.

606*d*': The apparatus A sends the gain corresponding to the second segmentation policy A to the apparatus B.

607*a*': The apparatus B obtains the intermediate parameter corresponding to the segmentation policy B based on the encrypted intermediate parameter corresponding to the segmentation policy B.

For specific content, refer to the description of step 606*b*'. In step 606*b*', A is replaced with B, and B is replaced with A.

607*b*': The apparatus B determines the gain corresponding to the segmentation policy B based on the intermediate parameter corresponding to the segmentation policy B.

For specific content, refer to the description of (3) in step 405 in the embodiment shown in FIG. 4A. Details are not described again.

608': The apparatus B determines the preferred segmentation policy of the first node based on the gain corresponding to the segmentation policy B and the gain corresponding to the second segmentation policy A.

For specific content, refer to the description of step 408 in the embodiment shown in FIG. 4A. For example, the segmentation policy A in step 408 is replaced with the second segmentation policy A. The preferred segmentation policy is the second segmentation policy A or the segmentation policy B.

Therefore, the tree model is updated based on the preferred segmentation policy. The following describes specific steps.

609: The apparatus B sends indication information about the preferred segmentation policy to the apparatus A.

Figures 1, 7A:
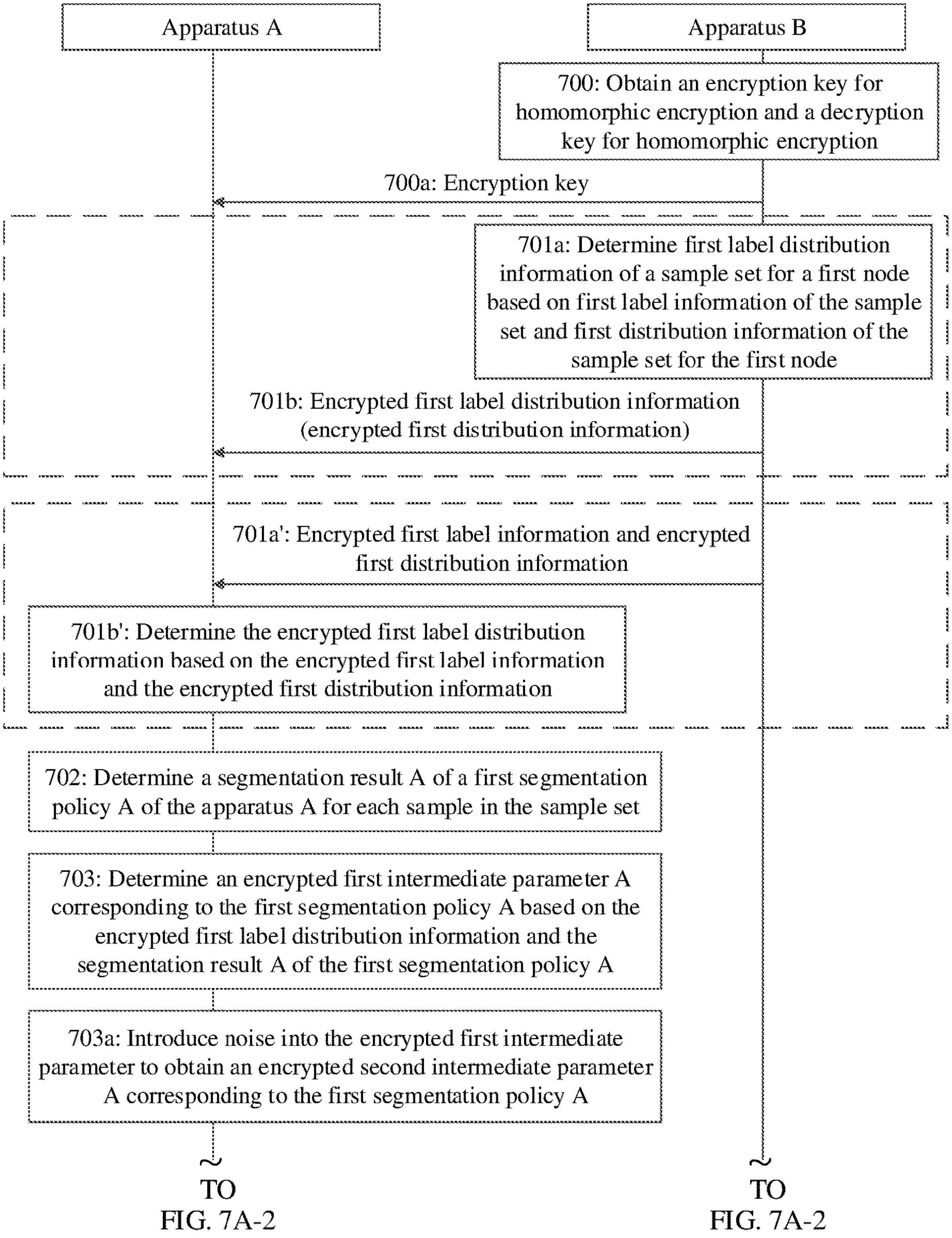
Figures 2, 7A:
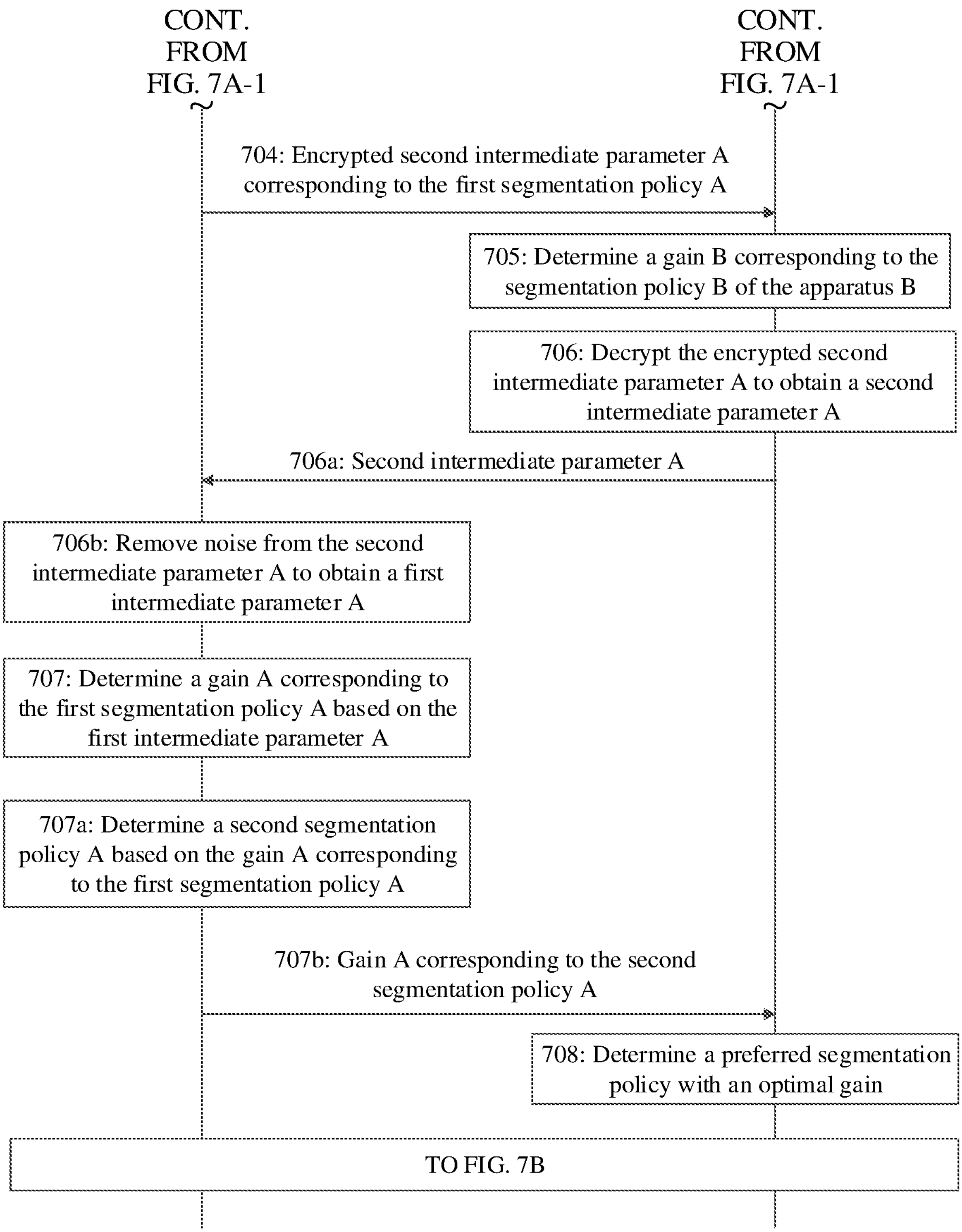
Figure 7B:
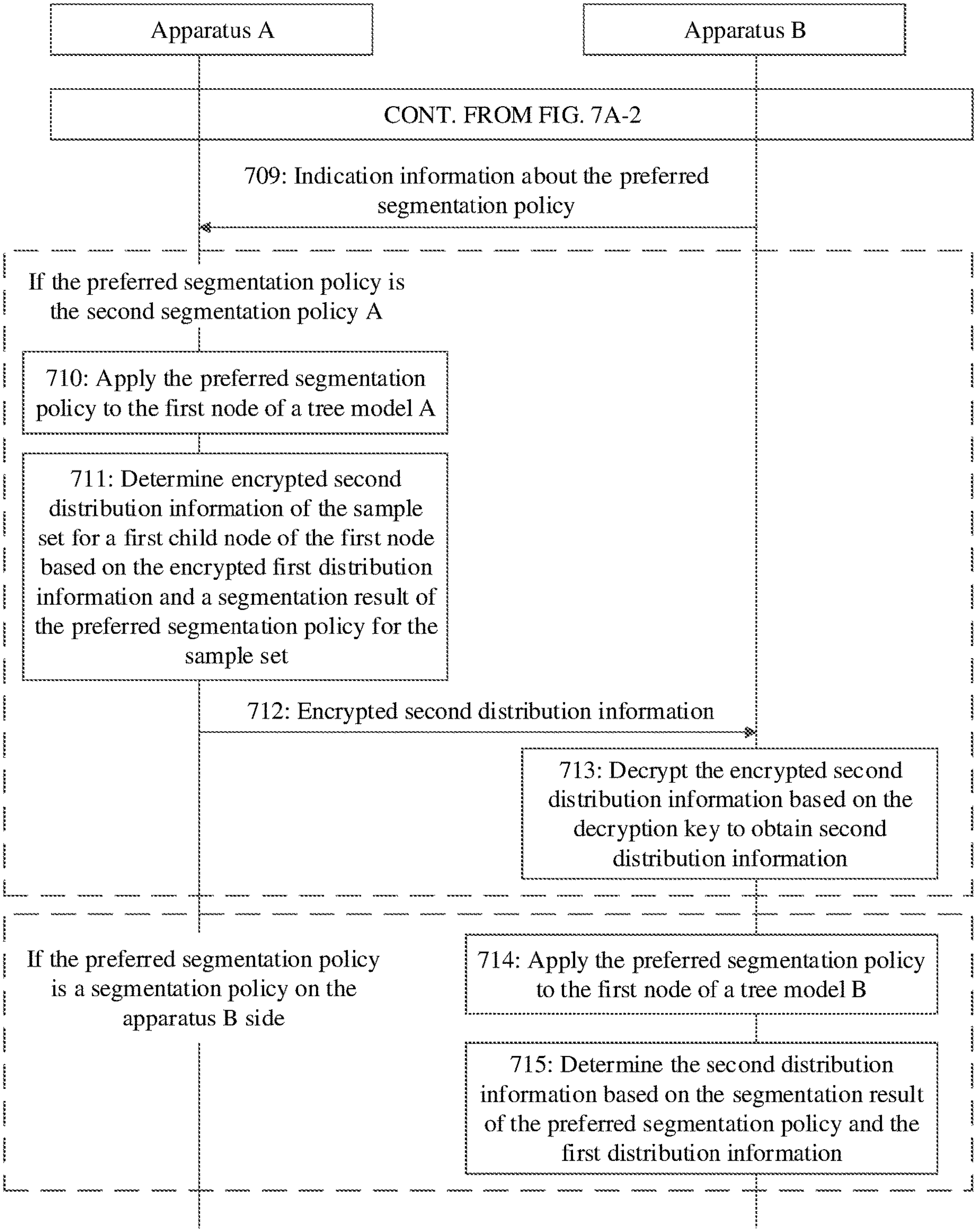

For specific content, refer to step 409 in the embodiment shown in FIG. 4B or step 709 in the embodiment shown in FIG. 7B. Details are not described herein again.

To make the description clearer, the following is described in two cases (the two cases: the preferred segmentation policy is one of the segmentation policies A (it should be understood that the second segmentation policy A is also one of the segmentation policies A) and the preferred segmentation policy is one of the segmentation policies B).

(1) If the preferred segmentation policy is one of the segmentation policies A.

For steps 610, 611, and 612, refer to descriptions of steps 410, 411, and 412 in the embodiment shown in FIG. 4B, respectively. Details are not described herein again.

613: The apparatus B determines the encrypted label distribution information of the first child node based on the encrypted second distribution information.

It should be understood that, if the first child node is a leaf node, training is stopped.

If the first child node is not a leaf node, for a specific method, refer to the description of step 601 above. The first node is replaced with the first child node. Therefore, the apparatus A and the apparatus B continue to train the first child node, to determine a preferred policy of the first child node. A method for training the first child node is not described herein again. Refer to the method for training the first node.

(2) If the preferred segmentation policy is one of the segmentation policies B.

614: The apparatus B applies the preferred segmentation policy to the first node of the tree model B.

For details, refer to the description of step 414 in the embodiment shown in FIG. 4B. Details are not described herein again.

615: The apparatus B determines the encrypted second distribution information of the sample set for the first child node based on the segmentation result of the preferred segmentation policy and the encrypted first distribution information.

For details, refer to the description of step 411 in the embodiment shown in FIG. 4B. For example, A in step 411 is replaced with B. Details are not described herein again.

It should be understood that the embodiments shown in FIG. 6A-1 and FIG. 6A-2 and FIG. 6B-1 and FIG. 6B-2 are also applicable to a multiple classification case. For details, refer to descriptions of the multiple classification case in the embodiments shown in FIG. 4A and FIG. 4B, and make adaptive modifications. Details are not described herein again. In addition, each data set in the embodiments shown in FIG. 6A-1 and FIG. 6A-2 and FIG. 6B-1 and FIG. 6B-2 may also be divided into blocks. Details are not described again.

It should be understood that a sequence number and a description sequence of steps in this disclosure do not limit an execution sequence of the steps. For example, step 605 and steps 602 to 604 are not limited to an execution sequence. To be specific, step 605 may be performed before step 602, performed after step 604, or performed along with any one of steps 602 to 604.

FIG. 7A-1 and FIG. 7A-2 and FIG. 7B show another method for training a tree model in a vertical federated learning scenario according to an embodiment of this disclosure. The method may be applied to application scenarios such as FIG. 2, FIG. 3A, and FIG. 3B. Compared with the embodiments shown in FIG. 4A and FIG. 4B, in this embodiment of this disclosure, an apparatus A introduces noise into an encrypted intermediate parameter corresponding to a segmentation policy A. Therefore, after decrypting the encrypted intermediate parameter, an apparatus B cannot directly obtain an intermediate parameter corresponding to the segmentation policy A. This further improves security. Specific steps are as follows:

700: The apparatus B obtains an encryption key (pk) for homomorphic encryption and a decryption key (sk) for homomorphic encryption.

700*a*: The apparatus B sends the encryption key (pk) for homomorphic encryption to the apparatus A.

It should be understood that step 700*a* is optional. For example, in step 701*b* and step 701*a*', the apparatus B may also send the encryption key (pk) to the apparatus A.

For steps 701*a*, 701*b*, 701*a*', and 701*b*', refer to descriptions of steps 401*a*, 401*b*, 401*a*', and 401*b*' in the embodiment shown in FIG. 4A, respectively. Details are not described herein again.

702: The apparatus A determines a segmentation result of a first segmentation policy A of the apparatus A.

For specific content, refer to the description of step 402 in the embodiment shown in FIG. 4A. The segmentation policy A in step 402 is replaced with the first segmentation policy A. Details are not described herein again.

703: The apparatus A determines an encrypted first intermediate parameter corresponding to the first segmentation policy A based on the segmentation result of the first segmentation policy A and encrypted first label distribution information.

For specific content, refer to the description of step 403 in the embodiment shown in FIG. 4A. In step 403, the segmentation policy A is replaced with the first segmentation policy A, and the intermediate parameter is replaced with the first intermediate parameter. Details are not described herein again.

703*a*: The apparatus A introduces noise into the encrypted first intermediate parameter to obtain an encrypted second intermediate parameter corresponding to the first segmentation policy A.

Specifically, the apparatus A determines first noise. The first noise is a random number generated by the apparatus A. For any segmentation policy $r_{iA}$ in the first segmentation policy A, the first noise is represented as $$X_{Ci}^{2v},\ X_{Di}^{2v},\ X_{Ci}^{2v+1},\ \text{and}\ X_{Di}^{2v+1}.$$

It should be understood that for different segmentation policies in the first segmentation policy A, the first noise may be the same or may be different. In addition, $$X_{Ci}^{2v},\ X_{Di}^{2v},\ X_{Ci}^{2v+1},\ \text{and}\ X_{Di}^{2v+1}$$

may be the same, or may be different. This is not limited in this disclosure. Setting of different noise provides higher security, but calculation costs are also higher. A person skilled in the art can set the noise according to actual conditions.

Further, the apparatus A encrypts the first noise based on the encryption key (pk) for homomorphic encryption to obtain second noise. For the segmentation policy $r_{iA}$, the second noise is represented as $$[\![X_{Ci}^{2v}]\!],\ [\![X_{Di}^{2v}]\!],\ [\![X_{Ci}^{2v+1}]\!],\ \text{and}\ [\![X_{Di}^{2v+1}]\!].$$

The apparatus A determines the encrypted second intermediate parameter based on the encrypted first intermediate parameter and the second noise. For example, a method for calculating the encrypted second intermediate parameter is as follows:

$$[\![XC_i^{A2v}]\!] = [\![C_i^{A2v}]\!] + [\![X_{Ci}^{2v}]\!]$$
$$[\![XD_i^{A2v}]\!] = [\![D_i^{A2v}]\!] + [\![X_{Di}^{2v}]\!]$$
$$[\![XC_i^{A(2v+1)}]\!] = [\![C_i^{A(2v+1)}]\!] + [\![X_{Ci}^{2v+1}]\!]$$
$$[\![XD_i^{A(2v+1)}]\!] = [\![D_i^{A(2v+1)}]\!] + [\![X_{Ci}^{2v+1}]\!]$$

It should be understood that there is another method for calculating the encrypted second intermediate parameter, for example, multiplying or subtracting the second noise and the encrypted first intermediate parameter. This is not limited in this disclosure.

704: The apparatus A sends the encrypted second intermediate parameter corresponding to the first segmentation policy A to the apparatus B.

For step 705, refer to the description of step 405 in the embodiment shown in FIG. 4A. Details are not described herein again.

706: The apparatus B decrypts the encrypted second intermediate parameter corresponding to the first segmentation policy A to obtain a second intermediate parameter corresponding to the first segmentation policy A.

The apparatus B receives the encrypted second intermediate parameters $$(\llbracket XC_i^{A2v} \rrbracket, \llbracket XD_i^{A2v} \rrbracket, \llbracket XC_i^{A(2v+1)} \rrbracket, \text{ and } \llbracket XD_i^{A(2v+1)} \rrbracket)$$

corresponding to the first segmentation policy A and sent by the apparatus A. It may be learned from step 703 that the encrypted second intermediate parameter includes noise (specifically, the second noise) from the apparatus A.

Specifically, the apparatus B decrypts the encrypted second intermediate parameter corresponding to the first segmentation policy A based on the decryption key (sk) to obtain the second intermediate parameter corresponding to the first segmentation policy A. In other words, the apparatus B decrypts $$\llbracket XC_i^{A2v} \rrbracket, \llbracket XD_i^{A2v} \rrbracket, \llbracket XC_i^{A(2v+1)} \rrbracket, \text{ and } \llbracket XD_i^{A(2v+1)} \rrbracket$$

based on the decryption key (sk) to obtain $$XC_i^{A2v}, XD_i^{A2v}, XC_i^{A(2v+1)}, \text{ and } XD_i^{A(2v+1)}.$$

The second intermediate parameter includes noise (specifically, the first noise) from the apparatus A. Therefore, the apparatus B cannot directly obtain a first intermediate parameter of the first segmentation policy A of the apparatus A based on the second intermediate parameter, to avoid inferring feature data of the apparatus A based on the first intermediate parameter. This further improves security.

706*a*: The apparatus B sends the second intermediate parameter corresponding to the first segmentation policy A to the apparatus A.

706*b*: The apparatus A removes noise from the second intermediate parameter corresponding to the first segmentation policy A to obtain the first intermediate parameter corresponding to the first segmentation policy A.

The apparatus A receives the second intermediate parameter sent by the apparatus B, and removes noise for the second intermediate parameter.

Specifically, the apparatus A removes the first noise from the second intermediate parameter, that is, determines the first intermediate parameter corresponding to the first segmentation policy A based on the first noise and the second intermediate parameter. For example, a method for determining the first intermediate parameter corresponding to the first segmentation policy A is as follows:

$$C_i^{A2v} = XC_i^{A2v} - X_{Ci}^{2v}$$

$$D_i^{A2v} = XD_i^{A2v} - X_{Di}^{2v}$$

$$C_i^{A(2v+1)} = XC_i^{A(2v+1)} - X_{Ci}^{2v+1}$$

$$D_i^{A(2v+1)} = XD_i^{A(2v+1)} - X_{Di}^{2v+1}$$

707: The apparatus A determines a gain corresponding to the first segmentation policy A based on the first intermediate parameter corresponding to the first segmentation policy A.

For specific content, refer to step 407 in the embodiment shown in FIG. 4A. Details are not described herein again.

707*a*: The apparatus A determines a second segmentation policy A based on the gain corresponding to the first segmentation policy A.

Specifically, the apparatus A determines an optimal gain in the gain corresponding to the first segmentation policy A. The segmentation policy corresponding to the optimal gain is referred to as the second segmentation policy A.

707*b*: The apparatus A sends a gain corresponding to the second segmentation policy A to the apparatus B.

Optionally, the apparatus A encrypts the gain corresponding to the second segmentation policy A based on the encryption key (pk) to obtain an encrypted gain corresponding to the second segmentation policy A. Therefore, the apparatus A sends the encrypted gain corresponding to the second segmentation policy A to the apparatus B. Therefore, a risk of data leakage caused by sending the gain in plaintext is avoided.

708: The apparatus B determines a preferred segmentation policy with an optimal gain based on the gain corresponding to the second segmentation policy A and the gain corresponding to the segmentation policy B.

For specific content, refer to the description of step 408 in the embodiment shown in FIG. 4A. For example, the segmentation policy A in step 408 is replaced with the second segmentation policy A. The preferred segmentation policy is the second segmentation policy A or the segmentation policy B.

It should be understood that, if the apparatus B receives, from the apparatus A, the encrypted gain corresponding to the second segmentation policy A, the apparatus B further decrypts the encrypted gain corresponding to the second segmentation policy A based on the decryption key (sk) to obtain the gain corresponding to the second segmentation policy A.

Therefore, the tree model is updated based on the preferred segmentation policy. The following describes specific steps.

709: The apparatus B sends indication information about the preferred segmentation policy to the apparatus A.

The apparatus A receives the indication information, and updates the tree model A based on the indication information. Specifically, the indication information indicates that the preferred segmentation policy is the second segmentation policy A or one of the segmentation policies B. Therefore, the apparatus A determines, based on the indication information, whether the preferred segmentation policy is the second segmentation policy A or one of the segmentation policies B.

To make the description clearer, the following is described in two cases (the two cases: the preferred segmentation policy is the second segmentation policy A and the preferred segmentation policy is one of the segmentation policies B).

(1) If the preferred segmentation policy is the second segmentation policy A.

For steps 710, 711, 712, and 713, refer to descriptions of steps 410, 411, 412, and 413 in the embodiment shown in FIG. 4B, respectively. Details are not described herein again.

(2) If the preferred segmentation policy is one of the segmentation policies B.

For steps 714 and 715, refer to descriptions of steps 414 and 415 in the embodiment shown in FIG. 4B, respectively. Details are not described herein again.

Compared with the embodiments shown in FIG. 4A and FIG. 4B, in the solution provided in this embodiment of this disclosure, the noise is further introduced into the encrypted intermediate parameter corresponding to the first segmentation policy A. Therefore, after decrypting the encrypted intermediate parameter, the apparatus B cannot directly obtain the intermediate parameter corresponding to the first segmentation policy A. Therefore, the apparatus B sends a decrypted intermediate parameter corresponding to the first segmentation policy A to the apparatus A for noise removal, and the apparatus A determines a second segmentation policy A with an optimal gain in the first segmentation policy A, to send a gain of the second segmentation policy A to the apparatus B, so that the apparatus B can determine a preferred policy based on the gain of the second segmentation policy A and the gain of the segmentation policy B. Therefore, the data that is on the apparatus A side and that can be obtained by the apparatus B is the gain of the second segmentation policy A, instead of the intermediate parameter corresponding to the first segmentation policy A. This reduces a risk of feature data leakage on the apparatus A side, and further improves security.

It should be understood that the embodiments shown in FIG. 7A-1 and FIG. 7A-2 and FIG. 7B are also applicable to a multiple classification case. For details, refer to descriptions of the multiple classification case in the embodiments shown in FIG. 4A and FIG. 4B. Details are not described herein again. In addition, each data set in the embodiments shown in FIG. 7A-1 and FIG. 7A-2 and FIG. 7B may also be divided into blocks. Details are not described again. The embodiments shown in FIG. 7A-1 and FIG. 7A-2 and FIG. 7B may also use the public key synthesis technology. Details are not described herein again.

It should be understood that a sequence number and a description sequence of steps in this disclosure do not limit an execution sequence of the steps. For example, step 705 and steps 702 to 704 are not limited to an execution sequence. To be specific, step 705 may be performed before step 702, performed after step 704, or performed along with any one of steps 702 to 704.

The foregoing mainly describes the solutions provided in embodiments of this disclosure from a perspective of interaction between the apparatuses. It may be understood that, to implement the foregoing functions, each apparatus includes a corresponding hardware structure and/or software module for performing each function. A person skilled in the art should be easily aware that, in combination with the examples described in embodiments disclosed in this specification, units, algorithms, and steps may be implemented by hardware or a combination of hardware and computer software in embodiments of this disclosure. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of this disclosure.

Figure 8:
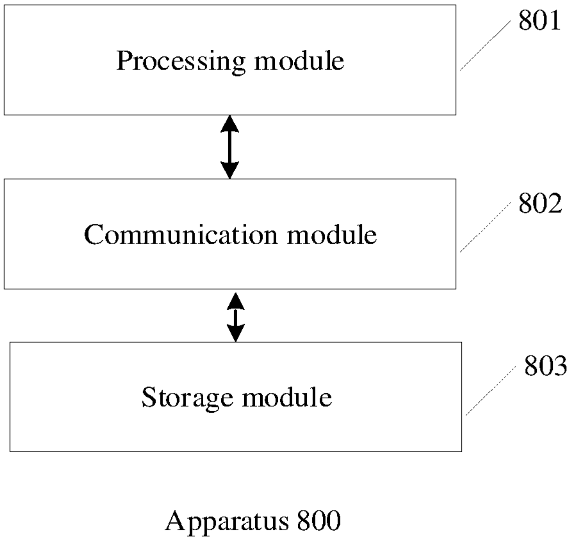
FIG. 8 is a schematic diagram of a structure of an apparatus according to an embodiment of this disclosure.

When an integrated module is used, FIG. 8 is a possible example block diagram of an apparatus according to an embodiment of this disclosure. The apparatus 800 may exist in a form of software, or may be a terminal device, a network device, or the like, or may be a chip in a terminal device or a network device. The apparatus 800 has functions of the apparatus B in the foregoing embodiment. The apparatus 800 includes a processing module 801 and a communication module 802. The communication module 802 may specifically include a receiving module and a sending module. The processing module 801 is configured to control and manage an action of the apparatus 800. The communication module 802 is configured to support communication between the apparatus 800 and another apparatus (for example, the apparatus A). The apparatus 800 may further include a storage module 803, configured to store program code of the apparatus 800, sample data (for example, the feature data subset B ($D^B$) of the foregoing sample set and the label set (Y) of the sample set), and data (for example, encrypted label distribution information and a preferred segmentation policy) generated in a training process.

The processing module 801 may support the apparatus 800 in performing the action of the apparatus B in the foregoing method examples, and may, for example, support the apparatus 800 in performing steps 400, 401*a*, 405 to 408, 413 to 415, and the like in FIG. 4A and FIG. 4B, steps 600*b*, 600*d*, 601*a*, 601*c*', 605 to 608, 607*a*', 607*b*', 608', 613 to 615, and the like in FIG. 6A-1 and FIG. 6A-2 and FIG. 6B-1 and FIG. 6B-2, and/or steps 700, 701*a*, 705 to 706, 708, 713 to 715, and the like in FIG. 7A-1 and FIG. 7A-2 and FIG. 7B.

Figures 1, 6A:
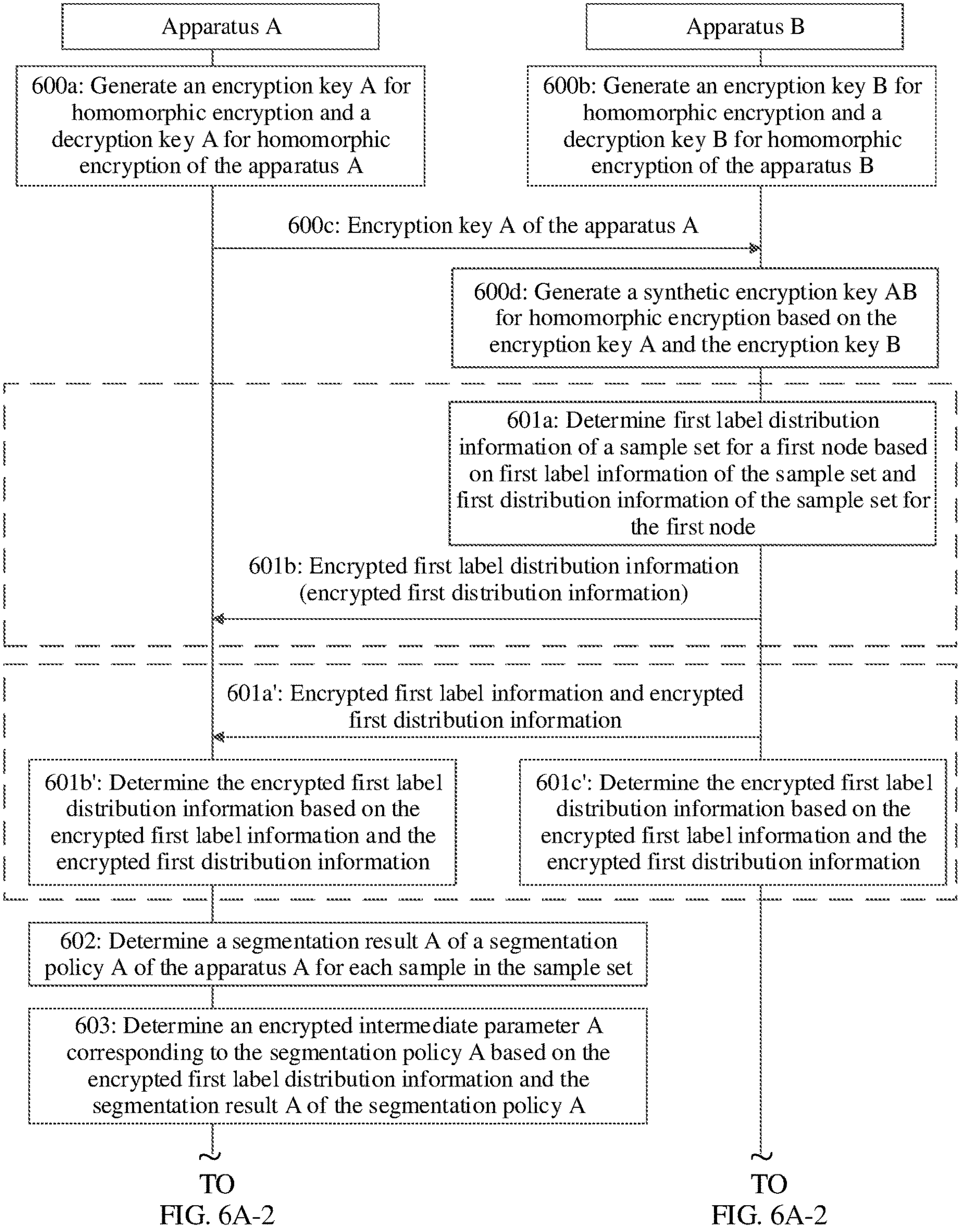
Figures 2, 6A:
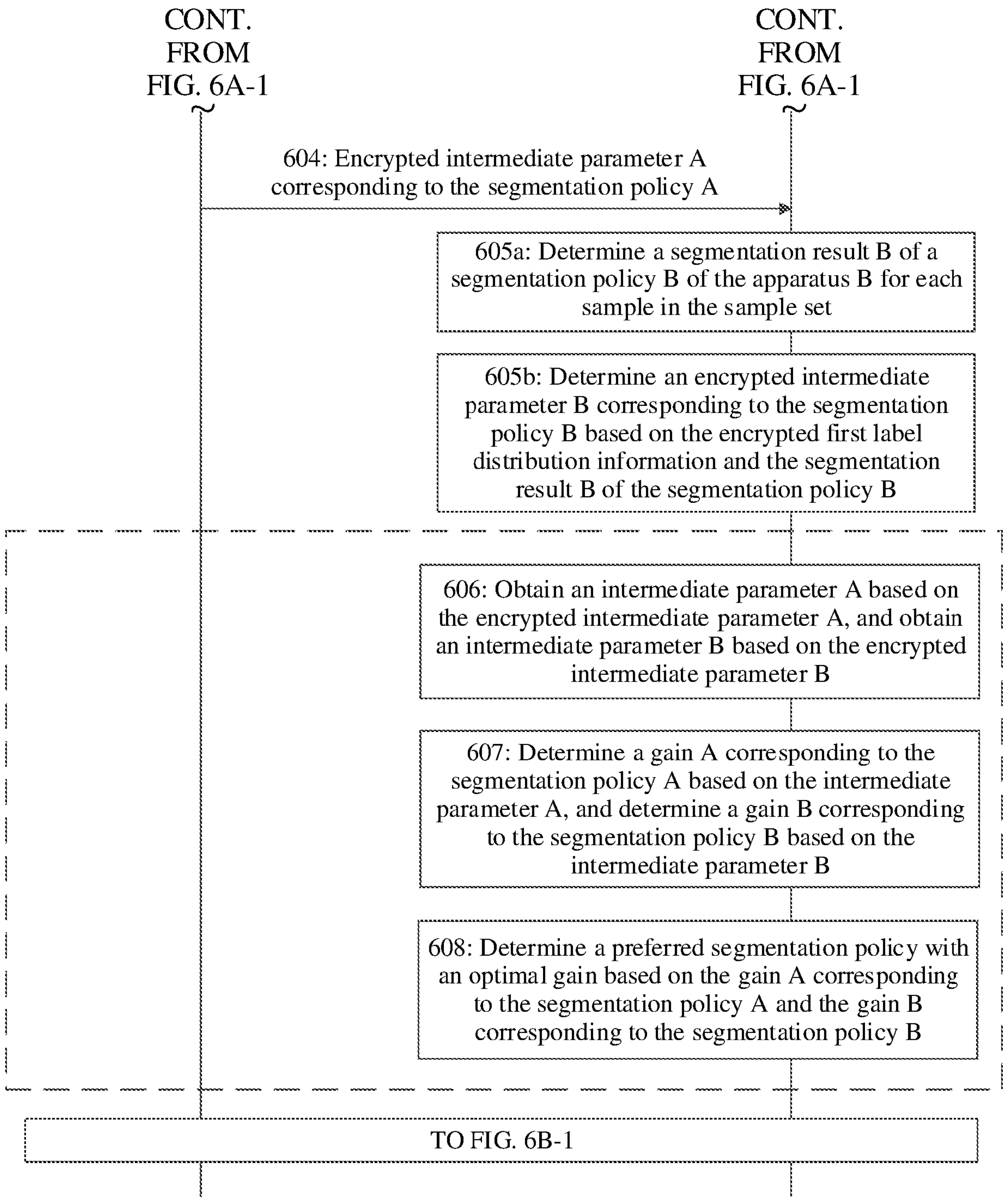
Figures 1, 6B:
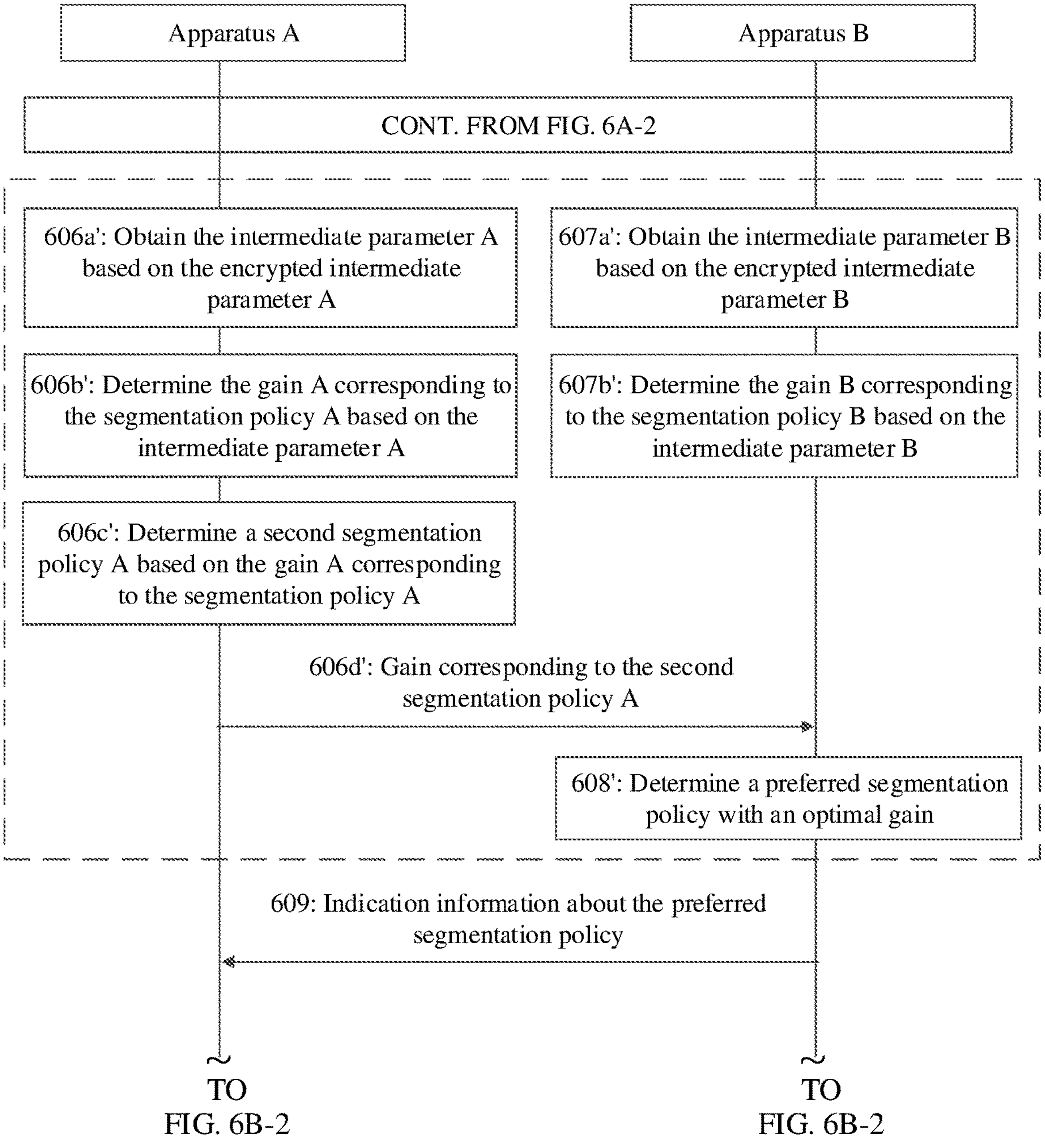
Figures 2, 6B:
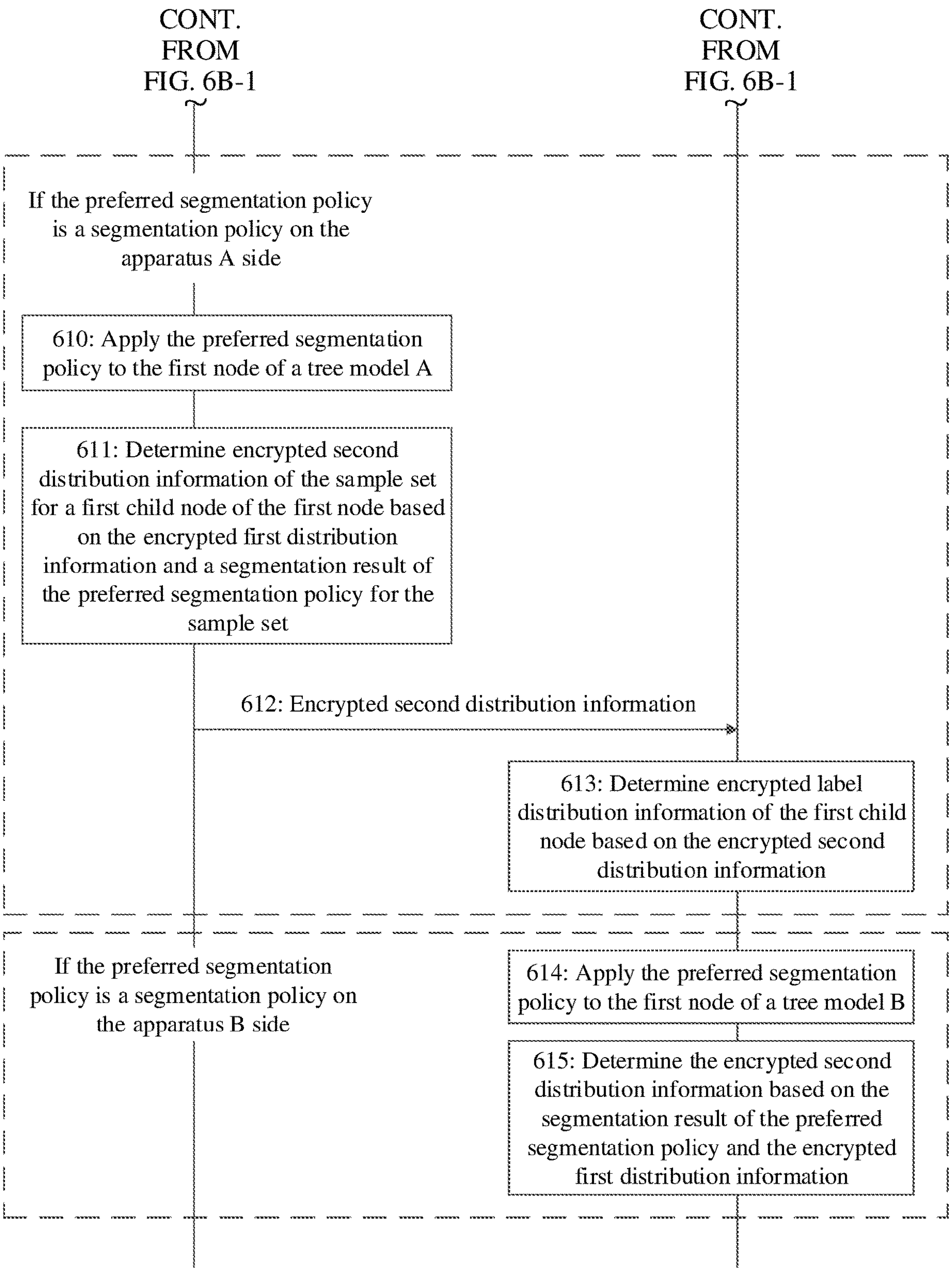

The communication module 802 may support communication between the apparatus 800 and another device, and may, for example, support the apparatus 800 in performing steps 401*b*, 401*a*', 404, 409, 412, and the like in FIG. 4A and FIG. 4B, steps 600*c*, 601*b*, 601*a*', 604, 606*d*', 609, 612, and the like in FIG. 6A-1 and FIG. 6A-2, and/or steps 700*a*, 701*b*, 701*a*', 704, 706*a*, 707*b*, 709, 712, and the like in FIG. 7A-1 and FIG. 7A-2 and FIG. 7B.

It should be understood that, in the foregoing example actions, optionally, the processing module 801 and the communication module 802 may alternatively selectively support the apparatus 800 in performing some of the actions.

Figure 10:
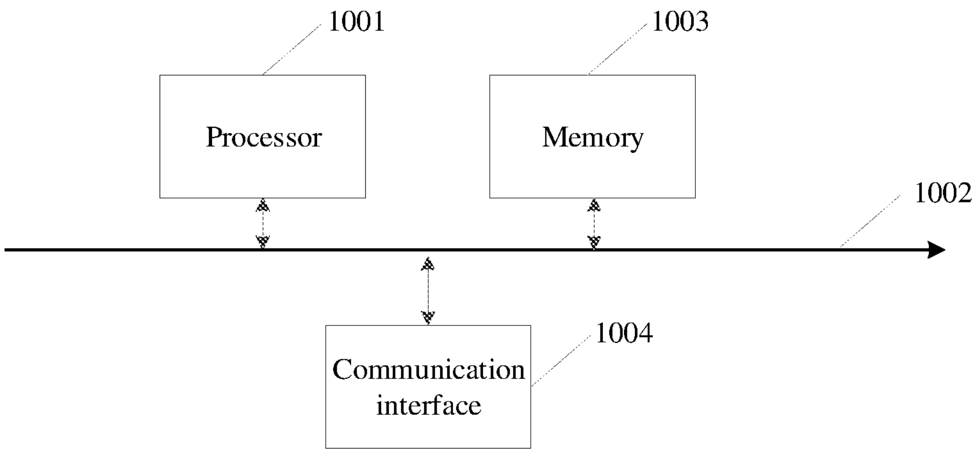
FIG. 10 is a schematic diagram of a structure of another apparatus according to an embodiment of this disclosure.

In a simple embodiment, a person skilled in the art may learn that the apparatus 800 may be implemented in the form shown in FIG. 10.

Figure 9:
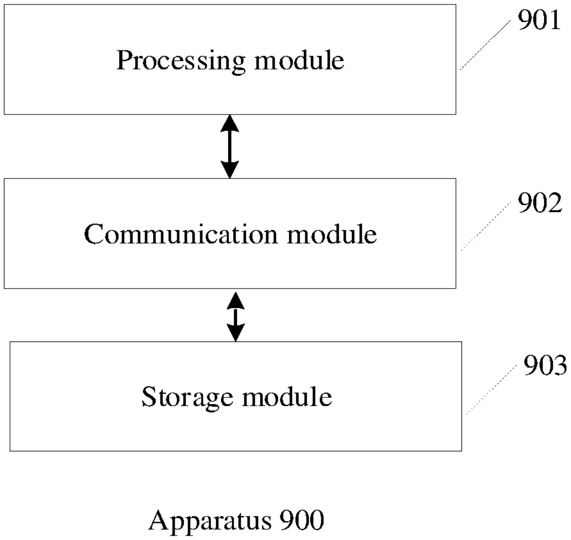
FIG. 9 is a schematic diagram of a structure of another apparatus according to an embodiment of this disclosure.

Similarly, FIG. 9 shows a possible schematic block diagram of an apparatus according to an embodiment of this disclosure. The apparatus 900 may exist in a form of software, or may be a terminal device, a network device, or the like, or may be a chip in a terminal device or a network device. The apparatus 900 has functions of the apparatus A in the foregoing embodiment. The apparatus 900 includes a processing module 901 and a communication module 902. The communication module 902 may specifically include a receiving module and a sending module. The processing module 901 is configured to control and manage an action of the apparatus 900. The communication module 902 is configured to support communication between the apparatus 900 and another apparatus (for example, the apparatus A). The apparatus 900 may further include a storage module 903, configured to store program code of the apparatus 900, sample data (for example, the feature data subset A ($D^A$) of the foregoing sample set), and data (for example, encrypted label distribution information and a preferred segmentation policy) generated in a training process.

The processing module 901 may support the apparatus 900 in performing the action of the apparatus A in the foregoing method examples, and may, for example, support the apparatus 900 in performing steps 401*b*', 402 to 403, 410 to 411, and the like in FIG. 4A and FIG. 4B, and steps 600*a*, 601*b*', 602 to 603, 606*a*' to 606*c*', 610 to 611, and the like in FIG. 6A-1 and FIG. 6A-2 and FIG. 6B-1 and FIG. 6B-2, and/or steps 701*b*', 702 to 703, 703*a*, 706*b*, 707, 707*a*, 710 to 711, and the like in FIG. 7A-1 and FIG. 7A-2 and FIG. 7B.

The communication module 902 may support communication between the apparatus 900 and another device, and may, for example, support the apparatus 900 in performing steps 401*b*, 404, 409, 412, and the like in FIG. 4A and FIG. 4B, steps 600*c*, 601*b*, 601*a*', 604, 606*d*', 609, 612, and the like in FIG. 6A-1 and FIG. 6A-2 and FIG. 6B-1 and FIG. 6B-2, and/or steps 700*a*, 701*b*, 701*a*', 704, 706*a*, 707*b*, 709, 712, and the like in FIG. 7A-1 and FIG. 7A-2 and FIG. 7B.

It should be understood that, in the foregoing example actions, optionally, the processing module 901 and the communication module 902 may alternatively selectively support the apparatus 900 in performing some of the actions.

In a simple embodiment, a person skilled in the art may learn that the apparatus 900 may be implemented in the form shown in FIG. 10.

FIG. 10 is a schematic diagram of a hardware structure of an apparatus woo according to an embodiment of this disclosure. The apparatus moo may be an apparatus A or an apparatus B.

The apparatus woo may include at least one processor 1001, a communication bus 1002, a memory 1003, a communication interface 1004, and an I/O interface. The processor may be a general-purpose central processing unit (CPU), a microprocessor, an application-specific integrated circuit (ASIC), or one or more integrated circuits for controlling solution program execution in this disclosure.

The communication bus may include a path for transmitting information between the foregoing components. The communication interface is any type of apparatus such as a transceiver, and is configured to communicate with another device or a communication network, for example, the Ethernet, a radio access network (RAN), or a wireless local area network (WLAN).

The memory may be but is not limited to a read-only memory (ROM) or another type of static storage device capable of storing static information and instructions, a random access memory (RAM) or another type of dynamic storage device capable of storing information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of instructions or a data structure and can be accessed by a computer. However, this is not limited thereto. The memory may exist independently, and is connected to the processor through the bus. The memory may alternatively be integrated with the processor.

The memory is configured to store program code for executing the solutions of this disclosure, and the processor controls the execution. The processor is configured to execute the program code stored in the memory.

During specific implementation, the processor may include one or more CPUs, and each CPU may be a single-core processor or a multi-core processor. The processor herein may be one or more devices, circuits, and/or processing cores configured to process data (for example, computer program instructions).

During specific implementation, in an embodiment, the apparatus may further include an input/output (I/O) interface. For example, an output device may be a liquid crystal display (LCD), a light emitting diode (LED) display device, a cathode ray tube (CRT) display device, or a projector. An input device may be a mouse, a keyboard, a touchscreen device, a sensing device, or the like.

It should be noted that a structure shown in FIG. 10 does not constitute a limitation on the apparatus woo. The apparatus woo may include more or fewer components than those shown in FIG. 10, or combine some components, or have different component arrangements.

The apparatuses in embodiments of this disclosure, such as the apparatus A and the apparatus B, may use the structure of the apparatus woo shown in FIG. 10.

For example, for the apparatus A (the second apparatus), when a processor in the apparatus A executes executable code or an application program stored in a memory, the apparatus A may perform method steps corresponding to the apparatus A in all the foregoing embodiments. For a specific execution process, refer to the foregoing embodiments. Details are not described herein again.

For example, for the apparatus B (the first apparatus), when a processor in the apparatus B executes executable code or an application program stored in a memory, the apparatus B may perform method steps corresponding to the apparatus B in all the foregoing embodiments. For a specific execution process, refer to the foregoing embodiments. Details are not described herein again.

In addition, in embodiments of this disclosure, the word "example" or "for example" is used to represent giving an example, an illustration, or a description. Any embodiment or design described by "example" or "for example" in embodiments of this disclosure should not be construed as being more preferred or advantageous than another embodiment or design. To be precise, the word such as "example" or "for example" is intended to present a related concept in a specific manner.

The terms "second" and "first" in embodiments of this disclosure are merely intended for a purpose of description, and cannot be understood as indicating or implying relative importance or implicitly indicating the quantity of indicated technical features. Therefore, a feature limited by "second" or "first" may explicitly or implicitly include one or more features. In the descriptions of this disclosure, unless otherwise stated, "a plurality of" means two or more than two.

In this disclosure, the term "at least one" means one or more, and the term "a plurality of" means two or more. For example, a plurality of first packets mean two or more first packets.

It should be understood that the terms used in the descriptions of various examples in this specification are merely intended to describe specific examples, but are not intended to constitute a limitation. The terms "one" ("a" and "an") and "the" of singular forms used in the descriptions of various examples and the appended claims are also intended to include plural forms, unless otherwise specified in the context clearly.

It should be further understood that, the term "and/or" used in this specification indicates and includes any or all possible combinations of one or more items in associated listed items. The term "and/or" describes an association relationship between associated objects and represents that three relationships may exist. For example, A and/or B may represent the following three cases: Only A exists, both A and B exist, and only B exists. In addition, the character "/" in this disclosure generally indicates an "or" relationship between associated objects. It should be further understood that when being used in this specification, the term "include" (also referred to as "includes", "including", "comprises", and/or "comprising") specifies presence of stated features, integers, steps, operations, elements, and/or components, but does not preclude presence or addition of one or more other features, integers, steps, operations, elements, components, and/or groups thereof.

It should be further understood that sequence numbers of processes do not mean execution sequences in embodiments of this disclosure. The execution sequences of the processes should be determined based on functions and internal logic of the processes, and should not be construed as any limitation on the implementation processes of embodiments of this disclosure. A person of ordinary skill in the art may be aware that, in combination with the examples described in embodiments disclosed in this specification, modules and algorithm steps can be implemented by electronic hardware, computer software, or a combination thereof. To clearly describe the interchangeability between hardware and software, the foregoing has generally described compositions and steps of the examples based on functions. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person of ordinary skill in the art that, for ease and brief description, for a detailed working process of the foregoing system, apparatus, and modules, refer to a corresponding process in the foregoing method embodiments. Details are not described herein again.

In the several embodiments provided in this disclosure, it should be understood that the disclosed system, apparatus, and method may be implemented in other manners. For example, division into the modules is merely logical function division and may be other division during actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all of the modules may be selected based on actual requirements to achieve the objectives of the solutions in embodiments of this disclosure.

In addition, functional modules in embodiments of this disclosure may be integrated into one processing module, or each of the modules may exist alone physically, or two or more modules may be integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of this disclosure essentially, or a part contributing to the conventional technology, or all or some of the technical solutions may be embodied in a form of a computer program product. The computer program product includes one or more computer instructions. When the computer program instructions are loaded and executed on a computer, the procedure or functions according to embodiments of this disclosure are all or partially generated. The computer may be a general-purpose computer, a dedicated computer, a computer network, or another programmable apparatus. The computer program product may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, DVD), a semiconductor medium (for example, a solid-state drive (SSD)), or the like.

The foregoing descriptions are merely specific embodiments of this disclosure, but are not intended to limit the protection scope of this disclosure. Any modification or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method, applied to a first apparatus, comprising:

determining, for a first node of a tree model, a first gain corresponding to a segmentation policy of the first apparatus;

receiving a first encrypted intermediate parameter corresponding to a first segmentation policy of a second apparatus for the first node and sent by the second apparatus, wherein the first encrypted intermediate parameter is determined based on encrypted label distribution information for the first node and a segmentation result of the first segmentation policy for each sample in a sample set, the sample set comprises samples for training the tree model, the encrypted label distribution information is determined based on encrypting first label information of the sample set and encrypting first distribution information of the sample set for the first node, the first label information comprises label data of each sample in the sample set, and the first distribution information comprises indication data indicating whether each sample in the sample set belongs to the first node; and determining a preferred segmentation policy of the first node based on the first gain corresponding to the segmentation policy of the first apparatus and a second gain corresponding to a second segmentation policy of the second apparatus for the first node, wherein the first segmentation policy comprises the second segmentation policy, and the second gain corresponding to the second segmentation policy is determined based on a second encrypted intermediate parameter corresponding to the second segmentation policy.

2. The method according to claim 1, further comprising:

obtaining the encrypted label distribution information based on the first label information and the first distribution information; and sending the encrypted label distribution information to the second apparatus.

3. The method according to claim 1, further comprising:

sending the encrypted first label information and the encrypted first distribution information to the second apparatus, wherein determining the encrypted label distribution information based on the first label information and the first distribution information comprises: determining the encrypted label distribution information based on the encrypted first label information and the encrypted first distribution information.

4. The method according to claim 1, further comprising:

obtaining an encryption key for homomorphic encryption and a decryption key for homomorphic encryption, wherein the encrypted label distribution information is determined based on the encryption key; and decrypting, based on the decryption key, the first encrypted intermediate parameter corresponding to the first segmentation policy to obtain a first intermediate parameter corresponding to the first segmentation policy, wherein the second gain corresponding to the second segmentation policy is determined based on a second intermediate parameter corresponding to the second segmentation policy.

5. The method according to claim 1, wherein the preferred segmentation policy is in the segmentation policy of the first apparatus, and the method further comprises:

determining a segmentation result of the preferred segmentation policy for each sample in the sample set; and determining second distribution information of the sample set for a first child node of the first node based on the segmentation result of the preferred segmentation policy and the first distribution information, or determining encrypted second distribution information of the sample set for the first child node based on the segmentation result of the preferred segmentation policy and the encrypted first distribution information.

6. The method according to claim 1, wherein the preferred segmentation policy is in the second segmentation policy, and the method further comprises:

sending the encrypted first distribution information and indication information about the preferred segmentation policy to the second apparatus; and receiving encrypted second distribution information that is of the sample set for a first child node of the first node and that is sent by the second apparatus, wherein the encrypted second distribution information is determined based on the encrypted first distribution information and a segmentation result of the preferred segmentation policy for the sample set.

7. The method according to claim 1, further comprising: receiving the second gain corresponding to the second segmentation policy and sent by the second apparatus, wherein the second gain corresponding to the second segmentation policy is an optimal gain in a third gain corresponding to the first segmentation policy, and the third gain corresponding to the first segmentation policy is determined based on the first encrypted intermediate parameter corresponding to the first segmentation policy.

8. The method according to claim 7, wherein the first encrypted intermediate parameter corresponding to the first segmentation policy is an encrypted second intermediate parameter corresponding to the first segmentation policy, the encrypted second intermediate parameter comprises noise from the second apparatus, and the method further comprises:

decrypting the encrypted second intermediate parameter to obtain a second intermediate parameter corresponding to the first segmentation policy; and sending the second intermediate parameter corresponding to the first segmentation policy to the second apparatus, wherein the third gain corresponding to the first segmentation policy is determined based on the second intermediate parameter corresponding to the first segmentation policy and obtained through noise removal.

9. The method according to claim 7, further comprising:

decrypting the first encrypted intermediate parameter corresponding to the first segmentation policy to obtain a decrypted intermediate parameter corresponding to the first segmentation policy and decrypted by the first apparatus; and sending, to the second apparatus, the decrypted intermediate parameter corresponding to the first segmentation policy and decrypted by the first apparatus, wherein the third gain corresponding to the first segmentation policy is determined based on the decrypted intermediate parameter corresponding to the first segmentation policy and decrypted by the first apparatus.

10. The method according to claim 1, wherein determining, for the first node, the first gain corresponding to the segmentation policy of the first apparatus comprises:

determining, for the first node, a segmentation result of the segmentation policy of the first apparatus for each sample in the sample set;

determining a third encrypted intermediate parameter corresponding to the segmentation policy of the first apparatus based on the segmentation result of the segmentation policy of the first apparatus for each sample and the encrypted label distribution information for the first node;

obtaining an intermediate parameter corresponding to the segmentation policy of the first apparatus based on the third encrypted intermediate parameter corresponding to the segmentation policy of the first apparatus; and determining the first gain corresponding to the segmentation policy of the first apparatus based on the intermediate parameter corresponding to the segmentation policy of the first apparatus.

11. A method applied to a second apparatus, comprising:

determining, for a first node of a tree model, a segmentation result of a first segmentation policy of the second apparatus for each sample in a sample set, wherein the sample set comprises samples for training the tree model;

determining an encrypted intermediate parameter corresponding to the first segmentation policy based on the segmentation result of the first segmentation policy for the sample set and encrypted label distribution information for the first node, wherein the encrypted label distribution information for the first node is determined based on encrypting first label information of the sample set and encrypting first distribution information of the sample set for the first node, the first label information comprises label data of each sample in the sample set, and the first distribution information comprises indication data indicating whether each sample belongs to the first node; and sending the encrypted intermediate parameter corresponding to the first segmentation policy to a first apparatus, wherein the encrypted intermediate parameter is used to determine a preferred segmentation policy of the first node.

12. The method according to claim 11, further comprising:

receiving the encrypted label distribution information sent by the first apparatus.

13. The method according to claim 11, further comprising:

receiving the encrypted first label information and the encrypted first distribution information sent by the first apparatus; and determining the encrypted label distribution information based on the encrypted first label information and the encrypted first distribution information.

14. The method according to claim 11, further comprising:

receiving the encrypted first distribution information and indication information about the preferred segmentation policy sent by the first apparatus;

determining the preferred segmentation policy based on the indication information, wherein the preferred segmentation policy is in the first segmentation policy of the second apparatus;

determining encrypted second distribution information of the sample set for a first child node of the first node based on the encrypted first distribution information and a segmentation result of the preferred segmentation policy for the sample set; and sending the encrypted second distribution information to the first apparatus.

15. The method according to claim 11, further comprising:

obtaining an intermediate parameter corresponding to the first segmentation policy based on the encrypted intermediate parameter corresponding to the first segmentation policy;

determining a first gain corresponding to the first segmentation policy based on the intermediate parameter corresponding to the first segmentation policy;

determining a second segmentation policy with an optimal gain based on the first gain corresponding to the first segmentation policy; and sending a second gain of the second segmentation policy to the first apparatus, wherein the second gain of the second segmentation policy is used to determine the preferred segmentation policy of the first node.

16. The method according to claim 15, wherein the encrypted intermediate parameter corresponding to the first segmentation policy is an encrypted second intermediate parameter corresponding to the first segmentation policy; and the determining the encrypted intermediate parameter corresponding to the first segmentation policy based on the segmentation result of the first segmentation policy for the sample set and the encrypted label distribution information for the first node comprises: determining an encrypted first intermediate parameter corresponding to the first segmentation policy based on the segmentation result of the first segmentation policy for the sample set and the encrypted label distribution information for the first node; and introducing noise into the encrypted first intermediate parameter to obtain the encrypted second intermediate parameter corresponding to the first segmentation policy; and the intermediate parameter corresponding to the first segmentation policy is a first intermediate parameter corresponding to the first segmentation policy, and obtaining the intermediate parameter corresponding to the first segmentation policy based on the encrypted intermediate parameter corresponding to the first segmentation policy comprises: receiving a second intermediate parameter corresponding to the first segmentation policy and sent by the first apparatus, wherein the second intermediate parameter is obtained by decrypting the encrypted second intermediate parameter; and removing noise from the second intermediate parameter corresponding to the first segmentation policy to obtain the first intermediate parameter corresponding to the first segmentation policy.

17. The method according to claim 16, wherein the second intermediate parameter is obtained by decrypting the encrypted second intermediate parameter based on a decryption key for homomorphic encryption, and the method further comprises: receiving an encryption key for homomorphic encryption sent by the first apparatus; determining first noise; and encrypting the first noise based on the encryption key to obtain second noise, wherein introducing the noise into the encrypted first intermediate parameter to obtain the encrypted second intermediate parameter comprises: determining the encrypted second intermediate parameter corresponding to the first segmentation policy based on the second noise and the encrypted first intermediate parameter, and removing the noise from the second intermediate parameter corresponding to the first segmentation policy comprises: removing the first noise from the second intermediate parameter corresponding to the first segmentation policy.

18. The method according to claim 15, wherein obtaining the intermediate parameter corresponding to the first segmentation policy based on the encrypted intermediate parameter corresponding to the first segmentation policy comprises:

receiving the encrypted intermediate parameter corresponding to the first segmentation policy and decrypted by the first apparatus and sent by the first apparatus; and obtaining the intermediate parameter corresponding to the first segmentation policy based on the encrypted intermediate parameter corresponding to the first segmentation policy and decrypted by the first apparatus.

19. A first apparatus, comprising:

at least one processor; and a non-transitory computer readable medium comprising instructions which, when executed by the at least one processor, cause the processor to:

determine, for a first node of a tree model, a first gain corresponding to a segmentation policy of the first apparatus;

receive, via a communication device coupled to the processor, a first encrypted intermediate parameter corresponding to a first segmentation policy of a second apparatus for the first node and sent by the second apparatus, wherein the first encrypted intermediate parameter is determined based on encrypted label distribution information for the first node and a segmentation result of the first segmentation policy for each sample in a sample set, the sample set comprises samples for training the tree model, the encrypted label distribution information is determined based on encrypting first label information of the sample set and encrypting first distribution information of the sample set for the first node, the first label information comprises label data of each sample in the sample set, and the first distribution information comprises indication data indicating whether each sample in the sample set belongs to the first node; and determine a preferred segmentation policy of the first node based on the first gain corresponding to the segmentation policy of the first apparatus and a second gain corresponding to a second segmentation policy of the second apparatus for the first node, wherein the first segmentation policy comprises the second segmentation policy, and the second gain corresponding to the second segmentation policy is determined based on a second encrypted intermediate parameter corresponding to the second segmentation policy.

20. The method according to claim 1, wherein the first apparatus and the second apparatus participate in vertical federated learning for training the tree model, and wherein the second apparatus computes the first encrypted intermediate parameter based on the encrypted label distribution information without being able to decrypt the first encrypted intermediate parameter, the encrypted label distribution information, and the encrypted first distribution information.

* * * * *